United States Patent
Fujino et al.

(10) Patent No.: US 6,399,199 B1
(45) Date of Patent: Jun. 4, 2002

(54) PREPEG AND CARBON FIBER REINFORCED COMPOSITE MATERIALS

(75) Inventors: Mutsuko Fujino; Shunsaku Noda; Hiroki Oosedo; Hideki Okita, all of Ehime (JP)

(73) Assignee: Toray Industries Inc., Tokyo (JP)

( * ) Notice: Subject to any disclaimer, the term of this patent is extended or adjusted under 35 U.S.C. 154(b) by 0 days.

(21) Appl. No.: 09/536,290

(22) Filed: Mar. 27, 2000

Related U.S. Application Data

(63) Continuation-in-part of application No. 09/522,414, filed on Mar. 9, 2000, which is a continuation-in-part of application No. 09/472,846, filed on Dec. 28, 1999, which is a continuation-in-part of application No. 09/319,902, filed as application No. PCT/JP98/04650 on Oct. 14, 1998.

(51) Int. Cl.$^7$ ................................................. D02G 3/00
(52) U.S. Cl. ........................ 428/396; 428/293.4; 428/375
(58) Field of Search ............................ 428/293.4, 296.7, 428/394, 395, 396, 364, 375

(56) References Cited

U.S. PATENT DOCUMENTS 4,487,863 A * 12/1984 Goan
4,956,411 A   9/1990 Tada et al.
5,128,425 A * 7/1992 Shiraishi et al.

FOREIGN PATENT DOCUMENTS

JP          07041650         2/1995

* cited by examiner

*Primary Examiner*—Merrick Dixon
(74) *Attorney, Agent, or Firm*—Morrison & Foerster LLP

(57) ABSTRACT

The invention provides a prepreg, formed by impregnating carbon fiber with an epoxy resin composition comprising an epoxy resin (A) and a curing agent (B) wherein the matrix resin content Wr (wt %) of the prepreg, the 0° tensile modulus E (GPa) of the carbon fiber, and the in-plane shear strength of S (MPa) of the carbon fiber reinforced composition material obtained by heating and curing the prepreg satisfy the following formulae (i) and (ii):

$$S \geq 205 \times LOG(E) + 610 \qquad (i)$$

$$15 \leq Wr \leq 40 \qquad (ii)$$

The prepreg has a high in-plane shear strength, a high mode I interlayer fracture toughness $G_{IC}$, an excellent CFRP tube in torsion al strength, a high radial compressive strength and a high impact strength and a light weight.

18 Claims, 1 Drawing Sheet

PREPEG AND CARBON FIBER REINFORCED COMPOSITE MATERIALS

This application is a continuation-in-part of Ser. No. 09/522,414, filed Mar. 9, 2000, which is a continuation-in-part of Ser. No. 09/472,846, filed Dec. 28, 1999, which is a continuation-in-part of Ser. No. 09/319,902, filed Jun. 14, 1999, which is a 371 of PCT/JP98/04650, filed Oct. 14, 1998.

TECHNICAL FIELD OF THE INVENTION

The present invention relates to fibre reinforced composite materials suitable for sports applications, aerospace applications and general industrial applications, and to a thermosetting resin composition and a prepreg for obtaining these composite materials. In more detail, it relates to a prepreg and carbon fibre reinforced composite materials, which can be suitably used, for example, as various frames, pipes and shafts, curved discs for airplanes, ships, motor vehicles, bicycles, etc. and also for industrial machines such as pumps and bush cutters, furthermore as various sports/leisure articles such as golf club shafts, fishing rods, ski poles, badminton racket shafts, tent poles and other tubes, and ski boards, snow boards, and golf club heads, moreover as civil engineering and architectural materials and repairing and reinforcing materials thereof, etc.

BACKGROUND OF THE INVENTION

On account, in particular, of their outstanding mechanical strength properties, fibre reinforced composite materials using a prepreg as an intermediate base material comprising reinforcing fibre and a matrix resin are widely employed in sports applications, aerospace applications and general industrial applications. Especially in sports applications, golf club shafts, fishing rods, rackets of tennis, badminton, etc., sticks of hockey, etc. are important applications.

In these applications, carbon fibre, aramid fibre and glass fibre are chiefly employed as the reinforcing fibre. Of these, carbon fibre is outstanding in its specific strength and specific modulus and it is particularly important in that high performance composite materials can be obtained.

Both thermoplastic resins and thermosetting resins are used as the matrix resin, but thermosetting resins are most often employed because of their excellent impregnation of the reinforcing fibre.

As thermosetting resins, epoxy resins, resins with a plurality of polymerizable unsaturated bonds in the molecule (vinyl ester resins, unsaturated polyester resins and the like), phenolic resins and cyanate resins are chiefly used. Especially in sports applications, carbon fibre is mainly used as the reinforcing fibre, and an epoxy resin, as the matrix resin.

For producing fibre reinforced composite materials, various methods are adopted. However, the method of using a prepreg as a sheet-like intermediate base material obtained by impregnating reinforcing fibre with a matrix resin is widely used. In this method, a plurality of sheets of a prepreg are laminated and heated, to obtain a formed article.

Fibre reinforced composite materials for sports such as golf club shafts and fishing rods are especially required to be lighter in weight, but the materials lighter in weight must be higher in strength.

As an approach to meet this requirement, efforts have been made to improve the reinforcing fibre, particularly carbon fibre, and many achievements have been made. However, precise analysis of breaking phenomena of golf club shafts and fishing rods, particularly those lighter in weight has revealed that it is not sufficient to only enhance the strength of carbon fibre.

Golf club shafts and fishing rods are usually produced by winding a unidirectional prepreg in several layers in different directions for lamination. When such composite materials are broken, the breaking mode depends on the material constitution and the external force acting manner (bending, torsion, crushing, etc.), but the breaking mode of either 0° (direction parallel to the reinforcing fibre) compression or 90° (direction perpendicular to the reinforcing fibre) tension at any layer is often a dominant factor. Next dominant is the breaking mode by shearing. Among them, the 0° compressive strength depends on the compressive strength of the reinforcing fibre, the adhesion between the reinforcing fibre and the matrix resin, and the elastic modulus of the matrix resin, and can be enhanced by increasing their values.

On the other hand, the 90° tensile strength depends on the tensile strength of the matrix resin. The tensile strength of the matrix resin tends to be higher when the elastic modulus and tensile elongation of the matrix resin are higher. However, the elastic modulus and tensile elongation of the matrix resin are in such a mutually sacrificial relation that one of them can be enhanced at the sacrifice of the other, and it has been difficult to enhance both simultaneously. Furthermore, even if the tensile strength of the matrix resin is enhanced, since the adhesion between the reinforcing fibre and the matrix resin is insufficient, rupture occurs at the boundary region between the reinforcing fibre and the matrix resin, making it difficult to let the obtained fibre reinforced composite material have sufficient mechanical strength properties.

So, to let the obtained fibre reinforced composite material have steadily high mechanical strength properties without relying on the material constitution and the external force acting manner, it is essential to enhance the tensile strength and elastic modulus of the matrix resin and also to enhance the adhesion between the reinforcing fibre and the matrix resin.

Furthermore, it is known that enhancing the adhesion between the reinforcing fibre and the matrix resin has an effect of enhancing the shear strength of the composite material, and that in addition to the effect of enhancing these static strength properties, it has an effect of enhancing dynamic strength properties such as impact resistance.

So, to let the obtained fibre reinforced composite material have steadily high mechanical strength properties without relying on the material constitution and the external force acting manner, it is essential to enhance the tensile strength and elastic modulus of the matrix resin and also to enhance the adhesion between the reinforcing fibre and the matrix resin.

A known means for improving the adhesion between the reinforcing fibre and the matrix resin is surface treatment of the reinforcing fibre, for example the silane coupling agent treatment of glass fibre and the electrolytic oxidation of carbon fibre. In particular, in the case of carbon fibre, when adhesion is improved by electrolytic oxidation, this is at the expense of the fibre strength so that there are limits thereto, and while there has been a strong demand for alternative means for improving the adhesion, no effective means has hitherto be found.

Simply applying any treatment to the reinforcing fibre has a limit in improving the adhesion between the reinforcing fibre and the matrix resin. It can be considered to improve the adhesion by modifying the matrix resin. At present, there is a finding that adding a certain thermoplastic resin to an epoxy resin composition generally used as the matrix resin is effective, but the effect achieved is still insufficient.

Fibre reinforced composite materials are formed variously for respective applications. When the form is a tube, strength properties such as tensile strength, compressive strength, bending strength and torsional strength are considered as important properties, and efforts are made to enhance these strength properties.

However, in recent years, for light weight members restricted in the degree of design freedom such as golf club shafts, the impact strength and radial compressive strength of a tube attract attention in addition to said strength properties, but since it is difficult to identify the factors for enhancing these properties inspite of various tests performed, it is difficult to improve those properties for making products with sufficient strength properties.

The objective of the present invention is to offer a prepreg capable of providing carbon fibre reinforced composite materials excellent in various properties, and to offer carbon fibre reinforced composite materials with such excellent properties.

In more detail, the objective of the present invention is to solve the conventional problems as described above, by offering a prepreg and carbon fibre reinforced composite materials with excellent properties, for example, a prepreg and carbon fibre reinforced composite materials capable of providing golf club shafts excellent in bending strength and torsional strength, and yet excellent in the radial compressive strength and impact strength of cylindrically formed articles.

DISCLOSURE OF THE INVENTION

In order to realise these objectives, the prepreg of the present invention comprises the following compositional components.

A prepreg, formed by impregnating carbon fibre with an epoxy resin composition containing the following components (A) and (B):

(A) an epoxy resin (B) a curing agent characterized in that the matrix resin content Wr (wt %) of the prepreg, the 0° tensile modulus E (GPa) of the carbon fibre and the inplane shear strength S (MPa) of the carbon fibre reinforced composite material obtained by heating and curing the prepreg satisfy the following formulae (i) and (ii).

$$S \geq -205 \times LOG(E) + 610 \quad \text{(i)}$$

$$15 \leq Wr \leq 40 \quad \text{(ii)}$$

The carbon fibre reinforced composite materials of the present invention are carbon fibre reinforced composite materials comprising cured aforesaid thermosetting resin composition and reinforcing fibre.

Explanation of the Numerical Codes

Figure 1:
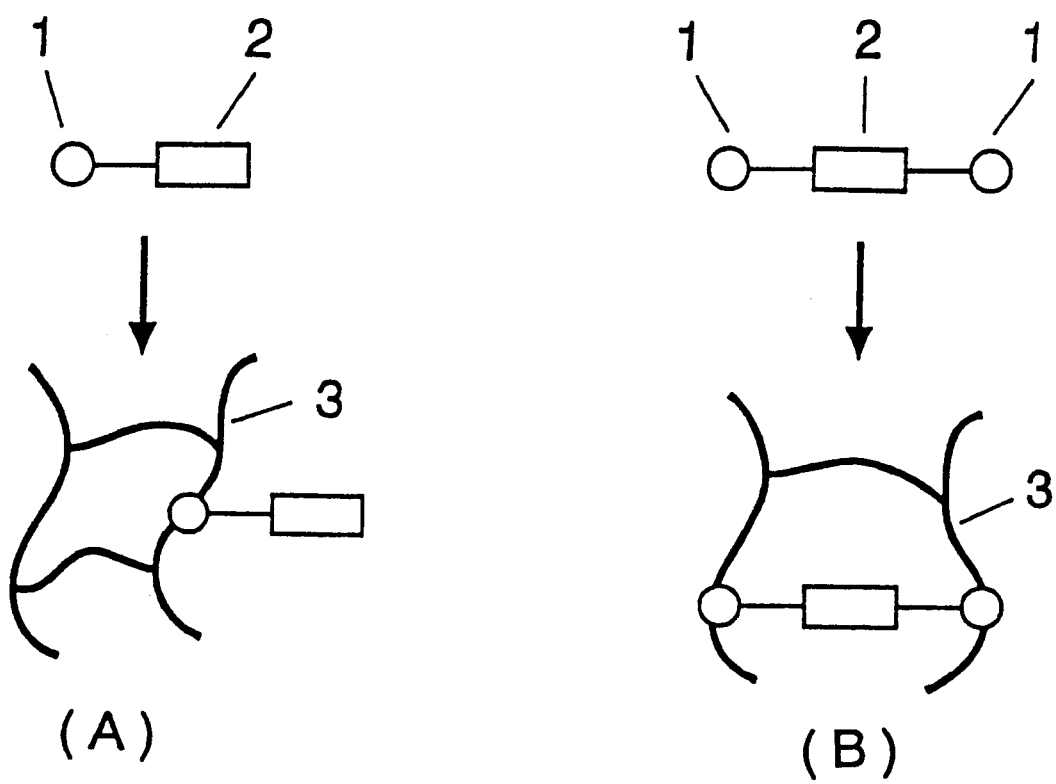
FIG. 1 is a schematic diagram of a polymer network.

1: a functional group which reacts with the thermosetting resin or its curing agent 2: a partial structure represented by any of formulae (1) to (4)

3: polymer network

THE BEST MODE FOR CARRYING OUT THE INVENTION

The inventors studied intensively the above problems, and found that these problems can be solved all at once by a prepreg and carbon fibre reinforced composite materials consisting of carbon fibre and an epoxy resin composition containing specific components.

A golf club shaft generally has straight layers with reinforcing fibre oriented in the shaft axis direction and bias layers with reinforcing fibre oriented at 30 degrees to 60 degrees in reference to the shaft axis direction.

When a fibre reinforced composite material is a tube like said golf club shaft, the radial compressive stress is mainly borne by the bias layers. In this case, on the respective bias layers, various stresses such as the tensile stress and compressive stress in the 0° direction and the tensile stress, compressive stress, shear stress and peel stress in the 90° direction act. The inventors studied and found that, among them, the shear stress tends to act powerfully, and found a fact that if a material with an excellent shear strength is adopted as the bias layers, the radial compressive strength as a tube such as a shaft can be enhanced.

Furthermore, it was found that since the straight layers act to exchange stresses with the bias layers, even if a material with a high shear strength is used as the straight layers, the radial compressive strength of the tube as a whole can be enhanced.

On the other hand, as for the strength property against the momentarily acting impact stress, i.e., the impact strength, since stresses acted complicatedly on the straight layers and the bias layers at the time of evaluation test, it was difficult to identify the main factors for enhancing the impact strength among the various properties of the fibre reinforced composite material. The impact strength was considered to have positive correlativity with the bending strength, but even when a material with a high bending strength was used, it was difficult to enhance the impact strength. However, for tubes such as a golf club shaft, it was found that since the impact strength has positive correlativity with the radial compressive strength, it is important to enhance the shear strength for enhancing the impact resistance.

It was found that if the shear strength, particularly the inplane shear strength of the fibre reinforced composite material is enhanced, the radial compressive strength, impact strength and furthermore torsional strength can be remarkably enhanced.

The inplane shear strength S (MPa) of the carbon fibre reinforced composite material (hereinafter abbreviated as CFRP) changes in relation with the 0° tensile modulus E (GPa) of carbon fibre and the matrix resin content Wr (wt %), and generally, it tends to be higher when the 0° tensile modulus E (GPa) of carbon fibre is smaller and when the matrix resin content Wr is larger.

To let the CFRP obtained by heating and curing the prepreg of the present invention have a high radial compressive strength and impact strength, the matrix resin content Wr (wt %), the 0° tensile modulus E (GPa) of carbon fibre and the inplane shear strength S (MPa) satisfy the following formulae (i) and (ii):

$$S \geq -205 \times LOG(E) + 610 \quad \text{(i)}$$

$$15 \leq Wr \leq 40 \quad \text{(ii)}$$

If the inplane shear strength S of CFRP is too small to satisfy the above formula (i), the radial compressive strength becomes small and the rigidity against the deformation stress also declines, while the impact strength becomes also small.

Furthermore, it is preferable that the 0° elastic modulus E (GPa) of carbon fibre and the inplane shear strength S (MPa)

of CFRP satisfy the following formula (iii). In this case, the CFRP can have a higher radial compressive strength and impact strength.

$$S \geq -205 \times LOG(E) + 620 \qquad (iii)$$

Furthermore, it is preferable that the CFRP obtained by heating and curing the prepreg of the present invention is 200 J/m² or more in the mode I interlayer fracture toughness GIC (hereinafter simply written as GIC) of the CFRP measured by the double cantilever (DCB) test of JIS K 7086. If GIC is less than 200 J/m², the obtained CFRP may be insufficient in impact resistance, torsional strength and radial compressive strength. To obtain a CFRP with a further higher impact resistance, it is desirable that GIC is 300 J/m² or more, preferably 400 J/m² or more. If GIC is about 1000 J/m², it is sufficient for achieving the effects of the present invention.

The prepreg of the present invention is obtained by impregnating carbon fibre with an epoxy resin composition. To enhance the 0° compressive strength, 90° tensile strength and shear strength of the obtained CFRP, it is preferable not only that the tensile elongation and elastic modulus of the matrix are high, but also that the adhesion is as high as possible. Therefore, in the present invention, to obtain the synergism of the high tensile elongation and the epoxy resin composition with adhesion, it is desirable to use carbon fibre with high adhesion and capable of providing a more highly durable formed article as the reinforcing fibre. In the present invention, glass fibre, aramid fibre, boron fibre, alumina fibre or silicon carbide fibre, etc. respectively treated on the surface to have moderately high adhesion can also be used as the reinforcing fibre. Two or more kinds of these fibres can also be used together.

The carbon fibre used can be carbon fibre with the filaments kept almost in the same direction, woven fabric, mat, knitted fabric, or single tow, etc. The woven fabric can be any of plain weave, satin weave, etc.

The carbon fibre used can be, specifically, acrylic carbon fibre, pitch carbon fibre or rayon carbon fibre, etc. Among them, acrylic carbon fibre is preferable since it has a high tensile strength. The carbon fibre can be used as twisted yarn, untwisted yarn or non-twisted yarn, etc., but non-twisted yarn or untwisted yarn is preferable, considering the balance between the formability and strength properties of the composite material. Furthermore, the carbon fibre in the present invention can also be graphite fibre.

As the carbon fibre of the present invention, carbon fibre with a high tensile modulus is preferable, since sports articles such as golf club shafts and fishing rods can manifest sufficient rigidity even if the amount of carbon fibre used is small. It is desirable that the tensile modulus of such carbon fibre is 200 GPa or more, preferably 210 to 800 GPa.

Carbon fibre with a higher tensile strength tends to be higher also in shear strength, but in this case, the tensile modulus tends to be lower. Therefore, since the shear strength and the tensile modulus are in a mutually sacrificial relation, it is important to enhance the shear strength of CFRP while keeping the tensile modulus of carbon fibre high.

If the adhesion between the carbon fibre and the matrix resin (hereinafter simply called the adhesion) is improved, the inplane shear strength of CFRP becomes higher. The adhesion can be improved by modifying the surface of carbon fibre or modifying the matrix resin, to improve the affinity and adhesion with the carbon fibre.

It is desirable that the carbon fibre of the present invention is 0.02 or more, preferably 0.04 or more, more preferably 0.06 or more in the surface specific oxygen content O/C (hereinafter abbreviated as O/C) measured by X-ray photoelectron spectroscopy. It is desirable that the upper limit of O/C is 0.3, preferably 0.25. If O/C is less than 0.02, the affinity with the matrix resin described later declines, and it may not be possible to enhance the inplane shear strength of CFRP. If O/C is more than 0.3, an oxide layer very lower in strength properties than the carbon fibre covers the surface of the carbon fibre, to impair the strength properties of the obtained CFRP, though the affinity between the carbon fibre and the matrix resin is improved.

Furthermore, it is desirable that the carbon fibre of the present invention is 0.2% or more, preferably 0.5% or more in the surface carboxyl group content COOH/C measured by chemically modified X-ray photoelectron spectroscopy. It is desirable that the upper limit of COOH/C is 3.0%, preferably 2.0%. If COOH/C is less than 0.2%, the affinity with the matrix resin described later declines, and it may not be possible to enhance the inplane shear strength of CFRP. If COOH/C is more than 3.0%, an oxide layer very lower in strength properties than the carbon fibre covers the surface of the carbon fibre, in a tendency to impair the strength properties of the obtained CFRP, though the affinity between the carbon fibre and the matrix resin is improved. Furthermore, the curing rate of the matrix resin may be retarded.

In the present invention, carbon fibre small in crystal grain size and having many magnetic points can be preferably used to enhance the adhesion as far as possible. Such carbon fibre must be 5 to 40 Angstrom in the crystal grain size Lc of the carbon network face obtained by wide angle X-ray diffraction. A preferable range is 10 to 35 Angstrom, and a more preferable range is 15 to 29 Angstrom.

Moreover, it is preferable to improve the adhesion, even if the tensile strength of carbon fibre is scarified to some extent as far as the elastic modulus of carbon fibre remains unchanged. It is preferable to improve the adhesion by reducing the diameter of carbon fibre for increasing the surface area of carbon fibre. Therefore, it is preferable to use carbon fibre substantially completely round in the sectional form (carbon fibre of 0.7 or more in the ratio of minor axis to major axis in its section) having a diameter of 4 to 7 μm, preferably 4 to 6 μm, or carbon fibre like a cocoon in the sectional form having a diameter of 3 to 7 μm, preferably 3 to 6 μm. In reference to a case of acrylic carbon fibre, the method for producing the carbon fibre of the present invention is described below in detail.

As the polymer, a copolymer obtained by copolymerizing 95 mol % or more, preferably 98 mol % or more of acrylonitrile (AN) and 5 mol % or less, preferably 2 mol % or less of a stabilization promoter for promoting stabilization and capable of being copolymerized with acrylonitrile (AN) can be suitably used. As the stabilization promoter, a copolymer of a vinyl group-containing compound (hereinafter called a vinyl based monomer) can be suitably used. The vinyl based monomers which can be used include acrylic acid, methacrylic acid, itaconic acid, etc. Furthermore, a copolymer containing the ammonium salt of acrylic acid, methacrylic acid or itaconic acid partially or wholly neutralized by ammonia can be more suitably used as the stabilization promoter. As for the polymerization, well-known solution polymerization, suspension polymerization, or emulsion polymerization, etc. can be used.

The spinning dope made of the polymer is spun by wet spinning, semi-wet spinning, dry spinning, or melt spinning, and among them, wet spinning or semi-wet spinning can be preferably used. The solvent used for the spinning dope can be any publicly known organic or inorganic solvent, but it is preferable to use an organic solvent. Specifically, dimethyl sulfoxide, dimethylformamide or dimethylacetamide, etc. can be used. If nitric acid or a concentrated aqueous solution of an inorganic salt such as sodium rhodanate aqueous solution or zinc chloride aqueous solution is used as the solvent, carbon fibre with a desired surface roughness may not be obtained.

The spun and coagulated yarn is washed with water, drawn, dried, oiled, etc., to produce an acrylic precursor.

Furthermore, the acrylic precursor is stabilized and carbonized, to obtain carbon fibre with desired performance. It is desirable that the precursor to be stabilized has a single yarn fineness of 3 to 11 $\mu$m, preferably 3 to 9 m, more preferably 3 to 7 $\mu$m in view of productivity. Furthermore, it is desirable that the number of single filaments per yarn is 1000 to 60000, preferably 3000 to 48000, still more preferably 12000 to 30000.

Specific stabilization conditions are stated below, though the conditions are not limited to the following.

It is preferable that the drawing ratio in stabilization is 0.85 to 1.0. It is more preferable that the drawing ratio is 0.89 to 0.94, to inhibit the irregular stabilization as a yarn bundle. If the drawing ratio is less than 0.85, the processability declines, and if more than 1.0, the diffusion of oxygen into the yarn bundle is prevented, in a tendency to cause remarkable irregular stabilization at the central portion of the yarn bundle.

It is desirable that the stabilization temperature is 200 to 300° C., and in view of cost reduction and higher carbon fibre performance, it is preferable that stabilization is effected at a temperature of 10 to 20° C. lower than the temperature at which yarn breaking is caused by reserved reaction heat at each progress degree of stabilization. The progress degree of stabilization can be observed in reference to the flame shrinkage holding rate measured according to the method described later for the obtained stabilized yarn.

In the present invention, it is desirable that the acrylic precursor is stabilized to ensure that the flame shrinkage holding rate of 70 to 90%, preferably 74 to 86%, more preferably 76 to 84%.

It is desirable that the stabilization time is 10 to 100 minutes, preferably 30 to 60 minutes, in view of higher productivity and carbon fibre performance. The stabilization time refers to the total time during which the precursor is retained in the stabilization furnace. If less than 10 minutes, the irregular stabilization of the fibre becomes remarkable, and the performance of the obtained carbon fibre may decline.

The precursor stabilized like this is carbonized in the subsequent carbonization process, to make carbon fibre.

In the carbonization process, the stabilized precursor must be preliminarily carbonized at 300 to 800° C. in an inactive atmosphere, and carbonized at 800 to 1600° C. in an inactive atmosphere. It is preferable that the latter carbonization temperature is 1100° C. or higher, preferably 1200° C. or higher. At lower than 1100° C., the water content of the obtained carbon fibre may become too high. It is desirable that the upper limit of the carbonization temperature is 1600° C., preferably 1500° C. If higher than 1600° C., crystal grows remarkably in the fibre, and the compressive strength and adhesion tend to decline.

It is desirable that the drawing ratio in the preliminary carbonization process is 1.0 to 1.5, preferably 1.02 to 1.3, more preferably 1.04 to 1.15. A higher drawing ratio is advantageous in view of the manifestation of tensile modulus, but if more than 1.5, the processability may decline remarkably.

The heating rate and processing time in the carbonization process can be adequately selected, considering the desired performance of carbon fibre and cost. Especially while 300 to 500° C./min and 1000 to 1200° C./min are respectively usually adopted heating rates, it is desirable to adopt 1000° C./min or less, preferably 500° C./min or less. Furthermore, it is preferable in view of cost reduction that the carbonization treatment time is as short as possible, as far as the carbonization degree does not pose any problem.

Moreover, if the carbon fibre of the present invention is graphitized at 2000 to 3300° C., preferably 2000 to 3000° C., more preferably 2000 to 2800° C. in an inactive atmosphere, graphite fibre dramatically excellent in strength properties compared to the conventional graphite fibre can be obtained.

The carbon fibre with the O/C and COOH/C in specific ranges can be easily obtained by electrolytic oxidation treatment or oxidation treatment in a vapor phase or liquid phase after completion of carbonization.

The electrolytic solution of electrolytic oxidation treatment can be an either acid or alkaline aqueous solution. The electrolyte of an acid aqueous solution can be sulfuric acid, nitric acid or hydrochloric acid, etc. The electrolyte of an alkali aqueous solution is preferably a compound containing ammonium ions, specifically ammonium hydrogencarbonate, ammonium carbonate or tetraalkylammonium hydroxide, etc. or a mixture thereof. Among them, ammonium hydrogencarbonate and ammonium carbonate are preferable.

It is preferable to optimize the quantity of electricity required for electrolytic treatment, to suit the carbonization degree of carbon fibre. However, for inhibiting the decline of tensile strength of carbon fibre substrate and lowering the crystallinity of the surface layer of carbon fibre, it is preferable to effect the electrolytic treatment at a small quantity of electricity several times. Specifically, it is preferable that the quantity of electricity per electrolytic cell is 1 coulomb/g·cell (coulomb per 1 g of carbon fibre per cell) to 40 columns/g·cell.

For energization, either direct energization in which carbon fibre and an electrode roller are kept in direct contact with each other, to be directly energized or indirect energization in which carbon and an electrode are energized through an electrolytic solution can be adopted. However, to obtain a carbon fibre substrate with a high tensile strength, indirect energization is preferable since fibre bundle fuzzing and electric sparks during electrolytic treatment can be inhibited.

Furthermore, it is preferable to wash with water and dry after completion of electrolytic treatment. In this case, to enhance the affinity and adhesion to the resin composition described later, it is desirable to dry at a temperature as low as possible, lest the functional groups existing on the surface of carbon fibre should be thermally decomposed. Specifically it is desirable that the drying temperature is 180 to 250° C., preferably 180 to 210° C.

The matrix resin in the prepreg and CFRP of the present invention is an epoxy resin composition containing the following components (A) and (B):

(A) an epoxy resin (B) a curing agent

In the present invention, the epoxy resin as the component (A) means a bi- or higher poly-functional epoxy resin having two or more epoxy groups in the molecule. Specifically, a glycidyl ether obtained from a polyol, a glycidylamine obtained from an amine having a plurality of active hydrogen atoms, a glycidyl ester obtained from a polycarboxylic acid or a, polyepoxide obtained by oxidizing a compound with a plurality of double bonds in the molecule, etc. can be used.

Specific examples of glycidyl ethers obtained from polyols include bisphenol type epoxy resins such as bisphenol A type epoxy resins, bisphenol F type epoxy resins and bisphenol S type epoxy resins, epoxy resins with a rigid structure, etc. respectively as described later.

Specific examples of glycidylamines obtained from amines with a plurality of active hydrogen atoms in the the amount is less than 70 wt %, the tensile elongation of the cured resin may become insufficient.

To keep the distance between crosslinking points large, it is advantageous to use a bifunctional epoxy resin with a large distance kept between the two epoxy groups. In this sense, at least one high molecular bifunctional epoxy resin selected from high molecular bisphenol A type epoxy resins of 450 or more in epoxy equivalent and high molecular bisphenol F type epoxy resins of 450 or more in epoxy equivalent can be preferably used. A bisphenol A type epoxy resin in this case refers to an epoxy resin represented by the following structural formula.

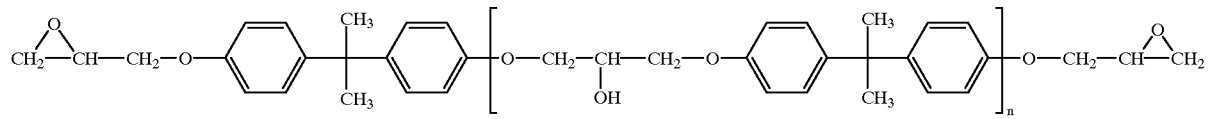

molecule include diglycidylaniline, tetraglycidyldiaminodiphenylmethane, triglycidylami- A bisphenol F type epoxy resin refers to an epoxy resin represented by the following structural formula.

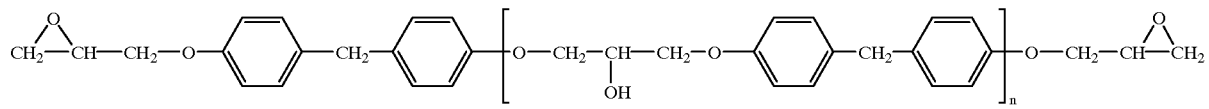

nophenol and tetraglycidyl m-xylenediamine as glycidylamines obtained from amines with a plurality of active hydrogen atoms in the molecule, etc.

Specific examples of glycidyl esters obtained from polycarboxylic acids include diglycidyl phthalate, diglycidyl terephthalate, the diglycidyl ester of dimer acid, etc. Commercial products of diglycidyl phthalate include "Shodine" 508 (made by Showa Denko K.K.), etc. The name shown within a pair of quotation marks is a registered trademark, trademark or trade name of a raw material maker, etc. This applies also hereinafter.

Specific examples of epoxy resins with glycidyl groups include triglycidyl isocyanurate, etc. Commercial products of triglycidyl isocyanurate include "Araldite" PT810 (made by Ciba Geigy), "Epikote" RXE15 (made by Yuka Shell Epoxy K.K.), EPITEC (made by Nissan Chemical Industries, Ltd.), etc.

Specific examples of polyepoxides obtained by oxidizing compounds with a plurality of double bonds in the molecule include epoxy resins having an epoxy cyclohexane ring, etc. Commercial products of epoxy resins having an epoxy cyclohexane ring include ERL-4206 (made by Union Carbide, epoxy equivalent 70–74), ERL-4221 (made by Union Carbide, epoxy equivalent 131–143), ERL-4234 (made by Union Carbide, epoxy equivalent 133–154), etc. As the epoxy resin having an epoxy cyclohexane ring, epoxidized soybean oil, etc. can also be used.

In the present invention, it is preferable to use a bifunctional epoxy resin with two epoxy groups in the molecule. If the bifunctional epoxy resin is kept low in crosslinking density and large in the distance between crosslinking points, the tensile elongation of the cured resin can be effectively enhanced. It is desirable that the bifunctional epoxy resin is contained by 70 to 100 wt %, preferably 80 to 100 wt % based on the weight of all the epoxy resins. If Commercial products of high molecular bisphenol A type epoxy resins include "Epikote" 1001 (epoxy equivalent 450–500), "Epikote" 1002 (epoxy equivalent 600–700), "Epikote" 1003 (epoxy equivalent 670–770), "Epikote" 1004 (epoxy equivalent 875–975), "Epikote" 1007 (epoxy equivalent 1750–2200), "Epikote" 1009 (epoxy equivalent 2400–3300), "Epikote" 1010 (epoxy equivalent 3000–5000 (the above are made by Yuka Shell Epoxy K.K.), "Epiclon" 1050 (epoxy equivalent 450–500), "Epiclon" 3050 (epoxy equivalent 740–860), "Epiclon" HM-101 (epoxy equivalent 3200–3900) (the above are made by Dainippon Ink & Chemicals, Inc.), "Epotohto" YD-011 (epoxy equivalent 450–500), "Epotohto" YD-014 (epoxy equivalent 900–1000), "Epotohto" YD-017 (epoxy equivalent 1750–2100), "Epotohto" YD-019 (epoxy equivalent 2400–3000), "Epotohto" YD-022 (epoxy equivalent 4000–6000) (the above are made by the Tohto Kasei Co.), etc.

Commercial products of high molecular bisphenol F type epoxy resins include "Epikote" E4002P (epoxy equivalent 610), "Epikote" E4003P (epoxy equivalent 800), "Epikote" E4004P (epoxy equivalent 930), "Epikote" E4007P (epoxy equivalent 2060), "Epikote" E4009P (epoxy equivalent 3030), "Epikote" E4010P (epoxy equivalent 4400) (the above are made by Yuka Shell Epoxy K.K.), "Epotohto" YDF-2001 (epoxy equivalent 450–500), "Epotohto" YDF-2004 (epoxy equivalent 900–1000) (the above are made by the Tohto Kasei Co.), etc.

As at least one high molecular bifunctional epoxy resin selected from high molecular bisphenol A type epoxy resins and high molecular bisphenol F type epoxy resins, one of the enumerated commercial products may be used, or a plurality of them can be used as a mixture. It is desirable that the amount of the high molecular bifunctional epoxy resin (the total amount when a plurality of the epoxy resins are used) is 15 to 70 wt %, preferably 30 to 60 wt % per 100 wt % of all the bifunctional epoxy resins. If the amount is less than 15 wt %, the effect of enhancing the tensile elongation of the cured resin may be insufficient, and if more than 70 wt %, it can happen that the rheological properties of the resin composition are impaired and that the mechanical strength properties of the cured resin become insufficient.

Bifunctional epoxy resins which can be preferably used in the present invention in addition to the above include an oxazolidone type epoxy resin obtained by letting a bisphenol A type epoxy resin react with a bifunctional isocyanate, as a component for enhancing tensile elongation without impairing elastic modulus and heat resistance. Commercial products of oxazolidone type epoxy resins include XAC4151 (made by Asahi Ciba, epoxy equivalent 512), XAC4152 (made by Asahi Ciba, epoxy equivalent 338), etc. The oxazolidone type epoxy resin can also be used as a mixture with any of the above high molecular bifunctional epoxy resins. It is desirable that the oxazolidone type epoxy resin is added by 5 to 50 wt %, preferably 15 to 40 wt % per 100 wt % of all the bifunctional epoxy resins. If the amount is less than 5 wt %, the effect of enhancing the tensile elongation of the cured resin may become insufficient, and if more than 50 wt %, it can happen that the rheological properties of the resin composition are impaired and that the mechanical strength properties of the cured resin become insufficient.

Furthermore, in the present invention, at least one low molecular bifunctional epoxy resin selected from low molecular bisphenol A type epoxy resins of less than 450 in epoxy equivalent, low molecular bisphenol F type epoxy resins of less than 450 in epoxy equivalent, and low, molecular bisphenol S type epoxy resin of less than 450 in epoxy equivalent (epoxy resin obtained by reaction between bisphenol S and epichlorohydrin) can also be preferably used.

Commercial products of low molecular bisphenol A type epoxy resins include "Epikote" 825 (epoxy equivalent 172–178), "Epikote" 828 (epoxy equivalent 184–194), "Epikote" 834 (epoxy equivalent 230–270) (the above are made by Yuka Shell Epoxy K.K), "Epotohto" YD-128 (the Tohto Kasei Co., epoxy equivalent 184–194), Epiclon 840 (epoxy equivalent 180–190), Epiclon 850 (epoxy equivalent 184–194), Epiclon 830 (epoxy equivalent 164–185) (the above are produced by Dainippon Ink & Chemicals, Inc.), Sumi-epoxy ELA-128 (made by Sumitomo Chemical Co., Ltd., epoxy equivalent 184–194), DER331 (made by the Dow Chemical Co., epoxy equivalent 182–192), etc.

Commercial products of low molecular bisphenol F type epoxy resins include "Epikote" 806 (epoxy equivalent 160–170), "Epikote" 807 (epoxy equivalent 160–175) (the above are made by Yuka Shell Epoxy K.K.), Epiclon 830 (made by Dainippon Ink & Chemicals, Inc., epoxy equivalent 165–180), "Epotohto" YDF-170 (Tohto Kasei Co., epoxy equivalent 160–180), etc.

Commercial products of low molecular bisphenol S type epoxy resin include "Denacol EX-251 (made by Nagase Chemicals Ltd., epoxy equivalent 189), etc.

Such a low molecular bifunctional epoxy resin can be used as a mixture with any of said high molecular bifunctional epoxy resins. One of the enumerated commercial products of low molecular bifunctional epoxy resins can be used, or a plurality of the epoxy resins can also be used as a mixture. It is desirable that the amount of the low molecular bifunctional epoxy resin (the total amount when a plurality of the epoxy resins are used) is 5 to 75 wt %, preferably 20 to 50 wt % per 100 wt % of all the bifunctional epoxy resins. If the amount is less than 5 wt %, the effect of enhancing the tensile elongation of the cured resin may be insufficient, and if more than 75 wt %, it can happen that the rheological properties of the resin composition are impaired and that the mechanical strength properties of the cured resin become insufficient.

In the present invention, to further enhance the elastic modulus of the cured resin, a tri- or higher poly-functional epoxy resin or a bifunctional epoxy resin with a rigid structure can also be used. A bifunctional epoxy resin with a rigid structure can be especially preferably used, since it has an effect of enhancing the elastic modulus while minimizing the decline of the tensile elongation of the cured resin.

Specific examples of polyfunctional epoxy resins include polyfunctional glycidylamine type epoxy resins such as novolak type epoxy resins (epoxy resins obtained by reaction between a novolak and epichlorohydrin) and glycidylamines obtained from amines having a plurality of active hydrogen atoms in the molecule such as tetraglycidyldiaminodiphenylmethane, triglycidylaminophenol, tetraglycidyl m-xylenediamine, and triglycidylaminocresol, and polyfunctional glycidyl ether type epoxy resins such as tetrakis(glycidyloxyphenyl)ethane and tris(glycidyloxy)methane, etc.

Commercial products of novolak type epoxy resins include "Epikote" 152 (made by Yuka Shell Epoxy K.K., epoxy equivalent 172–179), "Epikote" 154 (made by Yuka Shell Epoxy K.K., epoxy equivalent 176–181), DER438 (made by the Dow Chemical Co., epoxy equivalent 176–181), Araldite EPN1138 (made by Ciba, epoxy equivalent 176–181), Araldite EPN1139 (made by Ciba, epoxy equivalent 172–179), "Epotohto" YCPN-702 (made by Tohto Kasei Co., epoxy equivalent 200–230), BREN-105 (made by Nippon Kayaku Co., epoxy equivalent 262–278), etc.

Examples of glycidylamines include diglycidylaniline, tetraglycidyl-diaminodiphenylmethane commercialized as "Sumi-epoxy" ELM434 (made by Sumitomo Chemical Co., Ltd., epoxy equivalent 110–130), tetraglycidyl-m-xylilenediamine commercialized as TETRAD-X (made by Mitsubishi Gas Chemical Co., epoxy equivalent 90–105, etc.

Commercial products of triglycidylaminophenol include Sumi-epoxy ELM120 (made by Sumitomo Chemical Co., Ltd., epoxy equivalent 118) as triglycidyl-m-aminophenol and Araldite MY0510 (made by Ciba Geigy, epoxy equivalent 94–107) as triglycidyl-p-aminophenol, etc. Commercial products of tetraglycidyl m-xylylenediamine include TETRAD-X (made by Mitsubishi Gas Chemical Co., Inc., epoxy equivalent 94–107), etc.

Any of these polyfunctional epoxy resins can used as a mixture with any of said high molecular bifunctional epoxy resins and low molecular bifunctional epoxy resins. One of the enumerated commercial products of polyfunctional epoxy resins can be used, or a plurality of them can also be used as a mixture. It is desirable that the amount of the polyfunctional epoxy resin (the total amount when a plurality of the polyfunctional epoxy resins are used) is 0 to 30 wt %, preferably 0 to 20 wt % per 100 wt % of all the epoxy resins, because of a side reaction to raise the crosslinking density for sacrificing the tensile elongation.

Specific examples of bifunctional epoxy resins with a rigid structure include epoxy resins represented by the following general formulae (I) to (V).

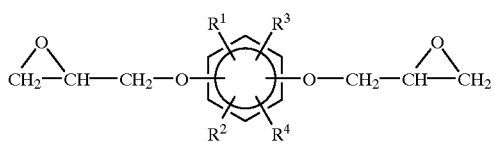

(I)

(R1 to R4 represent, respectively independently, a hydrogen atom, halogen atom or alkyl group with 1 to 8 carbon atoms.)

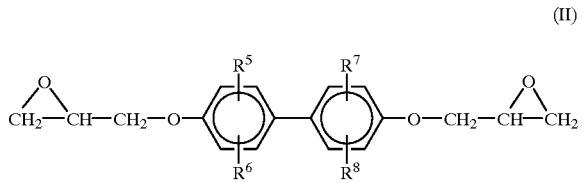

(II)

(R7 to R8 represent, respectively independently, a hydrogen atom, halogen atom or alkyl group with 1 to 8 carbon atoms.)

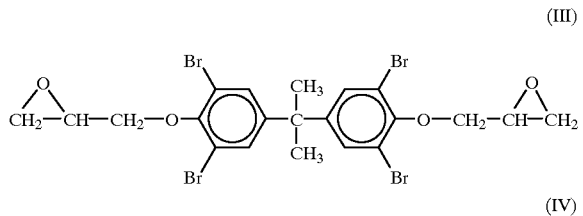

(III)

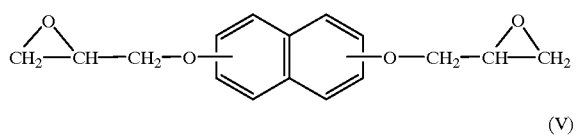

(IV)

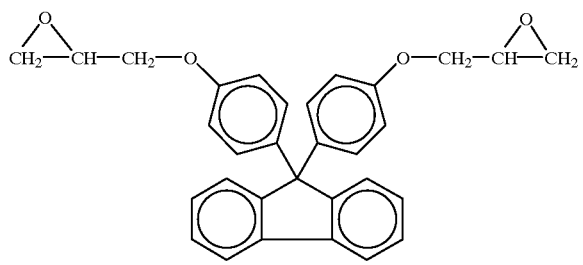

(V)

The epoxy resins represented by general formula (I) can be obtained by reaction between resorcinol, hydroquinone, pyrocatechol or any of substituent group derivatives thereof and epichlorohydrin.

The commercial products of the epoxy resins represented by general formula (I) include Denacol EX-201 (made by Nagase Chemicals Ltd., epoxy equivalent 118) as resorcinol diglycidyl ether, Denacol EX-203 (made by Nagase Chemicals Ltd., epoxy equivalent 112) as hydroquinone diglycidyl ether, "Epotohto" YDC-1312 (made by the Tohto Kasei Co., epoxy equivalent 170–185) as 2,5-di-t-butylhydroquinone diglycidyl ether, RE-701 (made by Nippon Kayaku Co., Ltd., epoxy equivalent 143) as 2,3,5-trimethylhydroquinone diglycidyl ether, etc.

The epoxy resins represented by general formula (II) can be obtained by reaction between 4,4'-dihydroxybiphenyl or any of substituent group derivatives thereof and epichlorohydrin.

Commercial products of the epoxy resins represented by general formula (II) include "Epikote" YX4000 (made by Yuka Shell Epoxy K.K., epoxy equivalent 180–192) as 4,4'-dihydroxy-3,3',5,5'-tetramethylbiphenyl diglycidyl ether, "Epikote" YL6121H (made by Yuka Shell Epoxy K.K., epoxy equivalent 175) as a mixture consisting of 4,4'-dihydroxy-3,3',5,5'-biphenyl diglycidyl ether and 4,4'-dihydroxybiphenyl diglycidyl ether, etc.

The epoxy resin represented by general formula (III) can be obtained by reaction between tetrabromobisphenol A and epichlorohydrin.

Commercial products of the epoxy resin represented by general formula (III) include "Epikote" 5050 (made by Yuka Shell Epoxy K.K., epoxy equivalent 380–410), Epiclon 152 (made by Dainippon Ink & Chemicals, Inc., epoxy equivalent 340–380), Sumi-epoxy ESB-400T (made by Sumitomo Chemical Co., Ltd., epoxy equivalent 380–420), "Epotohto" YBD-360 (made by the Tohto Kasei Co., epoxy equivalent 350–370), etc.

The epoxy resin represented by general formula (IV) can be obtained by reaction between dihydroxynaphthalene and epichlorohydrin.

Commercial products of the epoxy resin represented by general formula (IV) include Epiclon HP-4032H (made by Dainippon Ink & Chemicals, Inc., epoxy equivalent 250) as 1,6-dihydroxynaphthalene diglycidyl ether, etc.

The epoxy resin represented by general formula (V) can be obtained by reaction between 9,9-bis(4-hydroxyphenyl)fluorene and epichlorohydrin.

Commercial products of the epoxy resin represented by general formula (V) include Epon HPT Resin 1079 (made by Shell, epoxy equivalent 250–260), ESF-300 (made by Nippon Steel Chemical Co., Ltd., epoxy equivalent 246), etc.

As the epoxy resins with a rigid structure, at least one selected from the epoxy resins represented by general formulae (I) to (V) can be used. The epoxy resin with a rigid structure can be used as a mixture with any of the high molecular bifunctional epoxy resins, any of the low molecular bifunctional epoxy resins or any of the polyfunctional epoxy resins. One of the enumerated commercial products of epoxy resins with a rigid structure can be used, or a plurality of the epoxy resins can also be used as a mixture. It is desirable that the amount of the polyfunctional epoxy resin (the total amount when a plurality of the epoxy resins are used) is 0 to 70 wt %, preferably 0 to 50 wt % per 100 wt % of all the epoxy resins, because of a side reaction to raise the crosslinking density for sacrificing the tensile elongation.

The epoxy resin is used in combination with a curing agent. As examples of the curing agent, there are aromatic amines with active hydrogen such as 4,4'-diaminodiphenyl methane, 4,4'-diaminodiphenylsulphone, 3,3'-diaminodiphenylsulphone, m-phenylenediamine, m-xylylenediamine and the like, aliphatic amines with active hydrogen such as diethylenetriamine, triethylenetetramine, isophoronediamine, bis(aminomethyl)norbornane, bis(4-aminocyclohexyl)methane, polyethyleneimine dimer acid ester and the like, modified amines obtained by the reaction of these active hydrogen-containing amines with an epoxy compound, acrylonitrile, phenol and formaldehyde, thiourea and the like, tertiary amines without active hydrogen such as dimethylaniline, dimethylbenzylamine, 2,4,6-tris(dimethylaminomethyl)

phenol and 1-substituted imidazole, dicyandiamide, tetramethylguanidine, carboxylic acid anhydrides such as hexahydrophthalic anhydride, tetrahydrophthalic anhydride, methylhexahydrophthalic anhydride, methylnadic anhydride and the like, polycarboxylic acid hydrazides such as adipic acid hydrazide and naphthalenedicarboxylic acid hydrazide, polyphenol compounds such as novolak resins, polymercaptans such as the esters of thioglycolic acids and polyols, Lewis acid complexes such as boron trifluoride ethylamine complex, and aromatic sulphonium salts.

These curing agents can be combined with suitable curing auxiliaries to increase the curing activity. Preferred examples thereof are the combination of a urea derivative such as 3-phenyl-1,1-dimethylurea, 3-(3,4-dichlorophenyl)-1,1-dimethylurea (DCMU), 3-(3-chloro-4-methylphenyl)-1,1-dimethylurea or 2,4-bis(3,3-dimethylureido)toluene as a curing auxiliary with dicyandiamide, and the combination of a tertiary amine as a curing auxiliary with a carboxylic acid anhydride or novolak resin. The compounds used as curing auxiliaries often have the capacity to cure epoxy resins by themselves.

Furthermore, in the present invention, it is preferable that the epoxy resin composition contains either of the following component (C) or (D).

(C) a compound containing one functional group capable of reacting with component (A), an epoxy resin or component (B), a curing agent and a partial structure selected from the following formulae (1) to (4) in the molecule

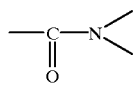
(1)

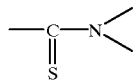
(2)

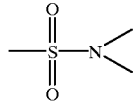
(3)

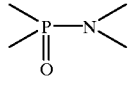
(4)

(D) a polyester polyurethane having aromatic rings in the molecule In the present invention, component (C) is added as a high polar compound for improving the adhesion.

The structures represented by formulae (1) to (4) may also be one part of a still more complex structure. For example, typical compounds with the amide linkage represented by general formula (1) are carboxamides but, besides these, the compound may also have the amide linkage as part of a ring or more complex structure, for example it may be an imide, urethane, urea, biuret, hydantoin, carboxylic acid hydrazide, hydroxamic acid, semicarbazide, semicarbazone or the like.

Component (C) is a compound incorporated in order to raise the adhesion to the reinforcing fibre. This component (C) reacts with the thermosetting resin or with its curing agent, so that the cured matrix resin has structures selected from general formulae (1) to (4).

The structures selected from general formulae (1) to (4) strongly interact with the reinforcing fibre, and improve the adhesion. Effective interactions comprise the following two types.

The first is hydrogen bonding. This is effective in cases where there are functional groups with, for example, OH or NH structures present at the reinforcing fibre surface.

The second is electrical attraction between dipoles. The structures selected from general formulae (1) to (4) are strong permanent dipoles. Induced dipoles are produced by permanent dipoles and then electrical attraction occurs between the two. The electrical attraction between dipoles is particularly important in terms of reinforcing fibres such as carbon fibre where there are few surface functional groups and where there has been no effective means hitherto for improving adhesion.

In order that the structures selected from general formulae (1) to (4) interact effectively with the reinforcing fibre, it is necessary to bring them into contact with the reinforcing fibre surface. Hence, component (B) has one functional group which can react with the thermosetting resin or with its curing agent. Where it has a plurality of functional groups which can react with the thermosetting resin or with its curing agent, the structures selected from general formulae (1) to (4) are readily incorporated into the interior of the network structure so that they do not readily contact the reinforcing fibre surface (FIG. 1A). Where there is one reactable functional group, the structures selected from general formulae (1) to (4) are not bound within the network and so readily contact the reinforcing fibre surface (FIG. 1B).

The functional group in component (C) which can react with the thermosetting resin or with its curing agent is selected according to the particular thermosetting resin employed, but it is preferred that it has relatively slow reactivity compared to the reaction of the thermosetting resin, which is the chief reaction, or compared to the reaction between the thermosetting resin and its curing agent. This is because, in such circumstances, the rate of consumption of component (C) in the initial period of the reaction is low, so that it mainly reacts in the latter period of the curing reaction, with the result that the structures selected from general formulae (1) to (4) are mostly present at the terminal regions of the network polymer, and so a considerable effect is readily obtained with just a low level of addition.

Moreover, the incorporation of component (C) does not merely improve the adhesion, but also has the effect of raising the elastic modulus of the cured thermosetting resin composition. This is thought to be because the structures selected from general formulae (1) to (4) produce powerful hydrogen bonding with structures such as OH and NH present in the cured material and so restrict molecular motion.

The functional groups which can react with the epoxy resin in component (C) include the carboxyl group, phenolic hydroxyl group, amino group, secondary amine structure, mercapto group and, etc.

As compounds with one group selected from the carboxyl group, phenolic hydroxyl group, amino group, secondary amine structure, mercapto group and epoxy group, there can be used those represented by general formula (6) or (7) below.

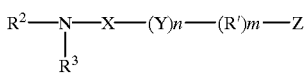 (6)

(Here, X represents one of the following,

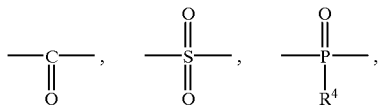

where $R^4$ represents an alkyl group or aryl group.

Y represents —O— or —$NR^5$—, where $R^5$ represents an alkyl group or aryl group, and n represents 0 or 1.

$R^1$ represents a divalent group derived from a hydrocarbon, and m represents 0 or 1.

Z represents a carboxyl group, phenolic hydroxyl group, amino group, mercapto group, —$NHR^6$ or

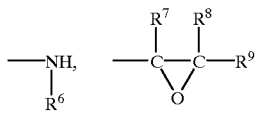

where $R^6$, $R^7$, $R^8$ and $R^9$ each represent hydrogen, an alkyl group or an aryl group.

$R^2$ represents hydrogen, an alkyl group or an aryl group, $R^3$ represents hydrogen, an alkyl group, aryl group, —$WR^{10}$, —W—$OR^{11}$ or —W—$NR^{12}R^{13}$, where $R^{10}$ and $R^{11}$ each represent an alkyl group or an aryl group, $R^{12}$ and $R^{13}$ each represent hydrogen, an alkyl group or an aryl group, and W represents —CO— or —$SO_2$—.

The aforesaid alkyl groups, aryl groups and $R^1$ may also have substituent groups selected from alkyl groups, aryl groups, halogens and alkoxy groups. In addition, any two of $R^1$, $R^2$, $R^3$, $R^5$ and $R^6$ may form a ring.)

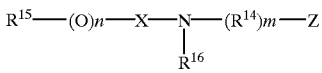 (7)

(Here, X represents one of the following,

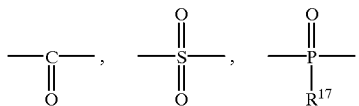

where $R^{17}$ represents an alkyl group or aryl group, and n represents 0 or 1.

$R^{14}$ represents a divalent group derived from a hydrocarbon, and m represents 0 or 1.

Z represents a carboxyl group, phenolic hydroxyl group, amino group, mercapto group, —$NHR^{18}$ or

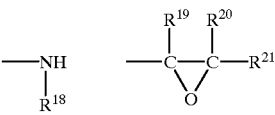

where $R^{18}$, $R^{19}$, $R^{20}$ and $R^{21}$ each represent hydrogen, an alkyl group or an aryl group. $R^{15}$ represents an alkyl group or an aryl group, and $R^{16}$ represents hydrogen, an alkyl group, aryl group or acyl group.

The aforesaid alkyl groups, aryl groups and $R^{14}$ may also have substituent groups selected from alkyl groups, aryl groups, halogens and alkoxy groups. In addition, any two of $R^{14}$, $R^5$, $R^{16}$ and $R^{18}$ may form a ring.)

As specific examples of the compounds represented by general formula (6) having one carboxyl group, there are oxamic acid, succinamidic acid, 2-(phenylcarbamoyloxy) propionic acid and 5-hydantoinacetic acid.

As specific examples of the compounds represented by general formula (7) having one carboxyl group, there are N-acetylglycine, N-acetylalanine, 4-acetamidobenzoic acid, N-acetylanthranilic acid, 4-acetamidobutyric acid, 6-acetamidohexanoic acid, hippuric acid, pyroglutamic acid, N-tosylglycine and N-dimethylphosphinoylglycine.

As specific examples of the compounds represented by general formula (6) having one phenolic hydroxyl group, there are salicylamide, 4-hydroxybenzamide and 4-hydroxyphenylacetamide.

As specific examples of the compounds represented by general formula (7) having one phenolic hydroxyl group, there are 4-hydroxyacetanilide, 3-hydroxyacetanilide and N-acetyltyramine.

As specific examples of the compounds represented by general formula (6) having one amino group, there are 4-aminobenzamide, 3-aminobenzamide, 4-aminobutyramide, 6-aminohexanoamide, 3-aminophthalimide, 4-aminophthalimide, sulphanilamide, 1-butyl-3-sulphanilylurea, asulam, Fast Red ITR base, FGL base and 2-amino-N-ethyl-N-phenylbenzenesulphonamide.

As specific examples of the compounds represented by general formula (7) having one amino group, there are 4'-aminoacetanilide, 4'-amino-N-methylacetanilide and 3'-aminopropionanilide.

As specific examples of the compounds represented by general formula (6) having one secondary amine structure, there are nipecotamide, N,N-diethylnipecotamide and isonipecotamide.

As specific examples of the compounds represented by general formula (7) having one secondary amine structure, there are 1-acetylpiperazine and 1-tosylpiperazine.

As specific examples of the compounds represented by general formula (7) having one mercapto group, there are 4-acetamidothiophenol and N-(2-mercaptoethyl)acetamide.

As specific examples of the compounds represented by general formula (6) having one epoxy group, there are glycidamide, N-phenylglycidamide, N,N-diethylglycidamide, N-methoxymethylglycidamide, N-hydroxymethylglycidamide, 2,3-epoxy-3-methylbutyramide, 2,3-epoxy-2-methylpropionamide and 9,10-epoxystearamide.

As a specific example of the compounds represented by general formula (7) having one epoxy group, there is N-glycidylphthalimide.

As well as the compounds represented by general formulae (6) and (7) above, as compounds with one amino group there are hydrazides, specific examples of which are acetohydrazide, benzohydrazide, 3-aminorhodanine and benzenesulphohydrazide.

Double bonds conjugated with an epoxy group on carbonyl group, etc, are examples of functional groups which can react with the curing agent. The double bond conjugated with a carbonyl group causes undergo a Michael type addition reaction with amino or mercapto groups in the curing agent.

As compounds with one double bond conjugated with a carbonyl group, there are the compounds represented by general formulae (8) or (9).

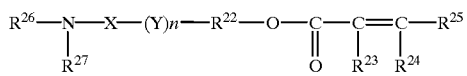

(Here, X represents one of the following

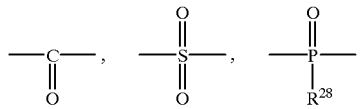

where $R^{28}$ represents an alkyl group or aryl group.

Y represents —O— or —$NR^{29}$—, where $R^{29}$ represents an alkyl group or aryl group, and n is 0 or 1.

$R^{22}$ represents a divalent group derived from a hydrocarbon, $R^{23}$, $R^{24}$ and $R^{25}$ each represent hydrogen, an alkyl group or an aryl group, $R^{26}$ represents hydrogen, an alkyl group or an aryl group, $R^{27}$ represents hydrogen, an alkyl group, an aryl group, —$WR^{30}$, —W—$OR^{31}$ or —W—$NR^{32}R^{33}$, where $R^{30}$ $R^{31}$ represent an alkyl group or aryl group, $R^{32}$ and $R^{33}$ represent hydrogen, an alkyl group or aryl group, and W represents —CO— or —$SO_2$—.

The aforesaid alkyl groups, aryl groups and $R^{18}$ may also have substituent groups selected from alkyl groups, aryl groups, halogens and alkoxy groups. In addition, any two of $R^{22}$, $R^{23}$, $R^{24}$, $R^{25}$, $R^{26}$, $R^{27}$, and $R^{29}$ may form a ring.)

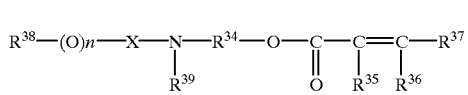

Here, X represents any of the following,

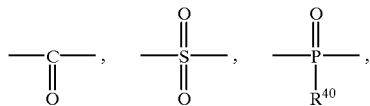

where $R^{40}$ represents an alkyl group or aryl group, and n represents 0 or 1.

$R^{34}$ represents a divalent group derived from a hydrocarbon.

$R^{35}$, $R^{36}$ and $R^{37}$ each represent hydrogen, an alkyl group or an aryl group.

$R^{38}$ represents an alkyl group or aryl group, and $R^{39}$ represents hydrogen, an alkyl group, an aryl group or an acyl group.

The aforesaid alkyl groups, aryl groups and $R^{34}$ may also have substituent groups selected from alkyl groups, aryl groups, halogens and alkoxy groups. In addition, any two of $R^{34}$, $R^{35}$, $R^{36}$, $R^{37}$, $R^{38}$ and $R^{39}$ may form a ring.)

Furthermore, in the. compound with one double bond conjugated with a carbonyl group, the carbonyl group conjugated with the double bond may also be the same as the carbonyl group of the structure represented by general formula (1). That is to say, the compound may also have a partial structure represented by formula (5).

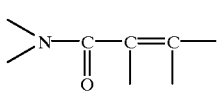

As a compound with a moiety represented by formula (5), there can be used a compound represented by general formula (10).

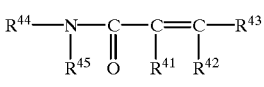

(Here, $R^{41}$, $R^{42}$ and $R^{43}$ each represent hydrogen, an alkyl group or an aryl group.

$R^{44}$ represents hydrogen, an alkyl group or an aryl group, and $R^{45}$ represents hydrogen, an alkyl group, an aryl group, —$WR^{46}$, —W—$OR^{47}$ or —W—$NR^{48}R^{49}$, where $R^{46}$ and $R^{47}$ each represent an alkyl group or aryl group, $R^{48}$ and $R^{49}$ each represent hydrogen, an alkyl group or an aryl group, and W represents —CO— or —$SO_2$—.

The aforesaid alkyl groups and aryl groups may also have substituent groups selected from alkyl groups, aryl groups, halogens and alkoxy groups. In addition, any two of $R^{41}$, $R^{42}$, $R^{43}$, $R^{44}$ and $R^{45}$ may form a ring.)

As the compound with a partial structure represented by formula (5), it is also possible to use maleimide or a maleimide derivative having an alkyl group or aryl group as a substituent.

Specific examples of the compounds represented by general formula (8) are 2-(phenylcarbamoyloxy)ethyl methacrylate, 2-(methacryloyloxy)propionamide, 2-(phenylureido)ethyl methacrylate, lactamide acrylate, lactamide methacrylate, 2-(dimethylthiocarbamoyloxy)ethyl methacrylate and 2-(tosylcarbamoyloxy)ethyl methacrylate.

Specific examples of the compounds represented by general formula (9) are 2-(methoxycarbonylamino)ethyl methacrylate and 2-(phenoxycarbonylamino)ethyl methacrylate.

Specific examples of the compounds represented by general formula (10) are acrylamide, methacrylamide, crotonamide, cinnamamide, N,N-dimethylacrylamide, N,N-diethylacrylamide, N-tert-butylacrylamide, N-isopropylacrylamide, N-butylacrylamide, N-hydroxymethylacrylamide, N-methoxymethylacrylamide, diacetone acrylamide, 1-acryloylmorpholine, 1,2,3,6-tetrahydrophthalimide and nadimide.

As maleimide derivatives with an alkyl or aryl substituent group, there are N-ethylmaleimide, N-isopropylmaleimide and N-phenylmaleimide.

In the present invention, component (C) used can consist of one or more compounds. It is desirable that the amount of component (C) (the total amount when a plurality of compounds are used) is 0.5 to 15 parts by weight, preferably 1 to 10 parts by weight per 100 parts by weight of the component (A). If less than 0.5 part by weight, the effect of improving adhesion cannot be sufficiently manifested, and if more than 15 parts by weight, adverse effects such as the decline of heat resistance may be caused.

The component (C) which can be used here can be either liquid or solid at room temperature. If the component (C) used is solid, it can be dissolved by such a means as heating with stirring after it has been added to the epoxy resin composition, or can also be added without being dissolved. When the solid component (C) is added without being dissolved, it is preferable that it is ground to a grain size of 10 μm or less before being added.

In the present invention, the polyester polyurethane having aromatic rings in the molecule as component (D) is added as a compound for enhancing the elastic modulus without lowering the tensile elongation of the cured resin.

That is, since the urethane structure existing in the molecule of component (D) forms a powerful hydrogen bond with the hydroxyl groups existing in the epoxy resin, to constrain molecular motion, the elastic modulus of the cured resin can be enhanced.

Furthermore, since the ester structure in the molecule of component (D) reacts with the amino group, mercapto group, phenolic hydroxyl group, etc. in the curing agent by nucleophilic substitution reaction, to produce chemical linkages as parts of the network of the cured epoxy resin, phase separation does not occur, and the adverse effect of lowering the elastic modulus of the cured resin is less likely to be caused. In the present invention, the component (D) used can be a polyester polyurethane which can be obtained by applying a conventional publicly known method such as one-shot method or prepolymer method, for example, by using a polyisocyanate having two or more isocyanate groups and, as required, a chain extender for the polyester polyol obtained by the polycondensation of a polycarboxylic acid and a polyhydric alcohol. In the present invention, the component (D) to be added to the resin composition can consist of one or more compounds.

The polycarboxylic acids which can be used here include malonic acid, succinic acid, succinic anhydride, glutaric acid, adipic acid, azelaic acid, sebacic acid, phthalic acid, phthalic anhydride, hexahydrophthalic anhydride, tetrahydrophthalic anhydride, isophthalic acid, terephthalic acid, nadic anhydride, maleic acid, maleic anhydride, fumaric acid, itaconic acid, citraconic acid, trimellitic acid, trimellitic anhydride, pyromellitic acid, pyromellitic anhydride, etc. Among them, aliphatic polycarboxylic acids such as succinic acid and adipic acid can be preferably used.

The polyhydric alcohols which can be used here include ethylene glycol, 1,2-propylene glycol, 1,3-propylene glycol, 1,3-butylene glycol, 1,4-butylene glycol, 1,5-butylene glycol, 1,5-pentanediol, 1,6-hexanediol, neopentyl glycol, diethylene glycol, dipropylene glycol, 2,2,4-trimethyl-1,3-pentanediol, cyclohexanediol, bisphenol A ethylene oxide addition product, bisphenol A propylene oxide addition product, polyethylene glycol, polypropylene glycol, polytetramethylene glycol, glycerol, trimethylolpropane, trimethylolethane, pentaerythritol, etc. Among them, 1,2-propylene glycol, 1,4-butylene glycol, 1,6-hexanediol, etc. can be preferably used.

As the polyisocyanate, an aromatic polyisocyanate is preferable for enhancing the elastic modulus of the cured product obtained by heating and curing the epoxy resin composition. Such aromatic polyisocyanates include, for example, 2,4-tolylene diisocyanate, 2,6-tolylene diisocyanate, 4,4'-diphenylmethane diisocyanate, tolidine diisocyanate, 1,5-naphthalene diisocyanate, isophorone diisocyanate, p-phenylene diisocyanate, m-phenylene diisocyanate, xylylene diisocyanate, tetramethylxylene diisocyanate, triphenylmethane triisocyanate, tris (isocyanatophenyl) thiophosphate, and their oligomers. Among them, 2,4-tolylene diisocyanate, 2,6-tolylene diisocyanate and 4,4'-diphenylmethane diisocyanate can be preferably used.

The chain extenders which can be used here include 1,2-propylene glycol, 1,4-butanediol, 1,6-hexanediol, polyethylene glycol, polypropylene glycol, and mixtures thereof.

In the present invention, it is desirable that the amount of component (D) (the total amount when a plurality of compounds are used) is 1 to 15 parts by weight, preferably 1 to 10 parts by weight per 100 parts by weight of component (A). If less than 1 part,: the effect of enhancing the elastic modulus cannot be manifested sufficiently, and if more than 15 parts by weight, adverse effects such decline of heat resistance may be caused.

It is also possible to incorporate other components such as polymer compounds, organic or inorganic particles, dyes, surfactants, release agents, waxes and the like as optional components in the thermosetting resin composition of the present invention.

As polymer compounds, thermoplastic resins are desirably used. By incorporating a thermoplastic resin, resin viscosity control, prepreg workability control, and the adhesion improving effect between matrix resin and reinforcing fibre are promoted.

It is particularly preferred that the thermoplastic resin employed here has functional groups which undergo hydrogen bonding, in that there can be expected a synergistic effect in terms of the improvement in adhesion which is the objective of the invention.

Examples of hydrogen bonding groups are the alcoholic hydroxyl group, the amide linkage and the sulphonyl group.

As examples of thermoplastic resins with alcoholic hydroxyl groups, there are polyvinyl acetal resins such as polyvinyl formal and polyvinyl butyral, polyvinyl alcohol and phenoxy resins; as examples of thermoplastic resins with amide linkages, there are polyamides and polyimides; and as an example of thermoplastic resins with sulphonyl groups, there are polysulphones, etc. The polyamides, polyimides and polysulphones may also have functional groups such as ether linkages and carbonyl groups in the main chain. In the case of polyamides, the amide group nitrogen atom may have a substituent group.

As examples of commercial thermoplastic resin products which are epoxy resin-soluble and which have hydrogen bonding groups, there are, in the case of the polyvinyl acetal resins, "Denka Butyral" and "Denka Formal" (made by Denki Kagaku Kogyo K.K.) and "Vinylek" (made by the Chisso Corp.); in the case of phenoxy resins, "UCAR" PKHP (made by Union Carbide); in the case of polyamide resins, "Macromelt" (made by the Henkel Hakusui Corp.) and "Amiran" CM4000 (made by Toray Industries); in the case of polyimides, "Ultem" (made by General Electric) and "Matrimid" 5218 (made by Ciba); and in the case of polysulphones, "Victrex" (made by Mitsui Toatsu Chemicals Inc.) and "Udel" (made by Union Carbide).

Where there is included a thermoplastic resin, using from 1 to 20 parts by weight thereof per 100 parts by weight of the epoxy resin is preferred in terms of providing the epoxy resin composition with suitable viscoelasticity and obtaining good composite material properties.

Rubber particles and thermoplastic resin particles are used as the organic particles incorporated into the thermosetting resin composition of the present invention. These particles have the effect of enhancing the resin toughness and raising the impact resistance of the fibre reinforced composite material.

Crosslinked rubber particles, and core-shell rubber particles in which some other polymer has been graft polymerized to the surface of crosslinked rubber particles, are preferably used as the rubber particles.

As examples of commercial crosslinked rubber particles, there are XER-91 (made by the Japan Synthetic Rubber Co.) which comprises a carboxyl-modified butadiene-acrylonitrile crosslinked copolymer, and the CX-MN series (made by Nippon Shokubai Co.Ltd.) and the YR-500 series (made by the Tohto Kasei Co. Ltd) which comprise acrylic rubber fine particles.

As examples of commercial core-shell rubber particles, there are "Paraloid" EXL-2655 (made by the Kureha Chemical Industry Co. Ltd) which comprises a butadiene/alkyl methacrylate/styrene copolymer, "Staphyloid" AC-3355 and TR-2122 (made by Takeda Chemical Industries, Ltd) which are acrylate ester/methacrylate ester copolymers, and "Paraloid" EXL-2611 and EXL-3387 (made by Rohm & Haas) which comprise a butyl acrylate/methyl methacrylate copolymer.

Polyamide or polyimide particle are preferably used as the thermoplastic resin particles. As examples of commercial polyamide particles, there are SP-500 made by Toray and "Orgasol" made by Atochem.

As inorganic particles, there can be incorporated silica, alumina, smectite, synthetic mica and the like. These inorganic particle are incorporated primarily for the purpose of rheology control, that is to say for raising the viscosity or conferring plasticity or thixotropy. Organic and inorganic particles are also incorporated for the purposes of coloration.

In order to raise the inplane shear strength of the CFRP, it is preferred that, as well as raising the adhension between the resin and reinforcing fibre, the flexual modulus, tensile elongation and plastic deformbility of the cured resin composition also be high. The flexural modulus of the cured material is at least 3.1 Gpa, preferably at least 3.3 GPa, with at least 3.5 GPa being still further preferred. Again, the tensile elongation of the cured material is preferably at least 8%, with at least 10% being still further preferred.

As indicators of plastic deformability, the three-point bending deflection of the cured resin or the rubbery elastic modulus G' obtained by dynamic viscoelasticity measurement can be used. It is desirable that the three-point bending deflection is 10 to 25 mm, preferably 15 to 25 mm, or that the rubbery elastic modulus G' (MPa) at the dynamic elasticity at a frequency of 0.5 Hz satisfies the following formula (iv). preferably the following formula (v).

$$1 \leq G' \leq 8 \quad (iv)$$

$$1 \leq G' \leq 5 \quad (v)$$

The method for producing the prepreg of the present invention, and the method for obtaining CFRP by laminating sheets of the prepreg and heating it for curing are described below.

The method of manufacturing the prepreg of the present invention and the method of obtaining CFRP by lamination and heat-curing of the prepreg is explained hereafter.

The prepreg can be produced by, for example, the wet method in which the matrix resin is dissolved in a solvent such as methyl ethyl ketone or methanol, to lower the viscosity, after which impregnation is effected, or by the hot melt method in which the viscosity of the resin is lowered by heating and then impregnation effected.

In the wet method, the reinforcing fibre is immersed in a liquid of an epoxy resin composition and pulled up, and the solvent is evaporated using an oven, etc., to obtain the intended prepreg.

In the hot melt method, the prepreg is produced either by directly impregnating the reinforcing fibre with the epoxy resin composition which has been heated to reduce its viscosity, or alternatively coated film of the epoxy resin composition is firstly produced on release paper or the like, and then said film placed on one or both sides of the reinforcing fibre and heat and pressure applied to effect impregnation of the resin. The hot melt method is preferred in that there is no residual solvent in the prepreg.

The moulding of the CFRP using the prepreg can be carried out for example by layering of the prepreg, after which the resin is heated and cured while applying pressure to the layered material.

For the purposes of applying heat and pressure, there can be used the press method, autoclave method, bagging method, wrapping tape method or internal pressure method, with the wrapping tape method and the internal pressure method being particularly preferred for sports equipment.

The wrapping tape method is a method in which the prepreg is wound onto a mandrel or the like, to form a cylindrically shaped article, and this method is preferably used when producing rod-shaped bodies such as a golf club shaft or fishing rod. Specifically, the prepreg is wound around the mandrel and then, in order to fix the prepreg and apply pressure, wrapping tape comprising a thermoplastic film is wound around the outside of the prepreg. After heating and curing the resin in an oven, the mandrel is removed and a cylindrically-shaped moulded body obtained.

The internal pressure method is a method in which a preform, produced by winding a prepreg onto a bladder comprising a thermoplastic resin tube or the like, is set in a mould and then, at the same time as applying pressure by the introduction of a high pressure gas into the bladder, the mould is heated and moulding performed. This method is suitably used for the moulding of complex shaped articles such as golf club shafts, bats, and tennis, badminton and other types of racket.

When the epoxy resin composition of the present invention is used as a prepreg, if the viscosity is too low, it is difficult to retain the shape of the prepreg, and suitable tackiness cannot be obtained. Furthermore, if the viscosity is too high, the reinforcing fibre cannot be sufficiently spread, and clearances may be formed among the filaments of the reinforcing fibre, to lower the grade of the prepreg. When the dynamic viscoelasticity is measured at 25° C. and 0.5 Hz, it is preferable that the complex viscosity is 10000 to 300000 Pa·s. A more preferable range is 50000 to 300000 Pa·s.

Furthermore, fibre reinforced composite materials can also be prepared by methods whereby the reinforcing fibre is directly impregnated with the epoxy resin composition of the present invention and then heating and curing performed, for example by means of a moulding method such as a hand lay-up method, filament winding method, pultrusion method or liquid composite moulding method. With these, the thermosetting resin composition can be prepared directly before use.

Since there is outstanding adhesion between the reinforcing fibre and the matrix resin, the fibre reinforced composite materials of the present invention are outstanding in their various properties, as described below.

The fibre reinforced composite materials of the present invention are outstanding in the 0° tensile strength of a unidirectional fibre reinforced composite material using continuous fibre. This effect is marked in the case where the elongation of the matrix resin is high. This is because of the effect of preventing the propagation of microcracks due to local fibre fracture. For the same reason, the mode I interlayer fracture toughness is also excellent.

The fibre reinforced composite materials of the present invention are outstanding in the 0° compressive strength and 0° flexural strength of a unidirectional fibre reinforced composite material using continuous fibre. This effect is marked in the case where the modulus of the matrix resin is high. This is because of the effect of preventing Euler buckling of the reinforcing fibre.

The fibre reinforced composite materials of the present invention are outstanding in the 90° tensile strength and 90° flexural strength of a unidirectional fibre reinforced composite material using continuous fibre. This effect is marked in the case where the elongation of the matrix resin is high. This is because of the effect of preventing separation between the reinforcing fibre and matrix.

The fibre reinforced composite materials of the present invention are outstanding in their shear strength, for example in their interlaminar shear strength and in-plane shear strength. This is because of the effect of preventing separation between the reinforcing fibre and matrix. For the same reason, the mode II interlayer fracture toughness measured by the end notched flexure method is also excellent.

Even where the fibre reinforced composite materials of the present invention have a structure other than that of a unidirectional fibre reinforced composite material, or in the case of reinforcement with short fibres, they are generally outstanding in their tensile, compression, flexural and shear strengths.

In sports applications or general industrial applications, hollow cylindrically-shaped composite materials are often employed, and for these too striking effects are to be seen in their torsional strength radial compressive strength.

In the case of a fibre reinforced composite material in which the reinforcing fibre is short fibre, there is also the effect that, in addition to strength, the stiffness is improved.

The fibre reinforced composite materials of the present invention are also outstanding in their impact resistance, for example in their Charpy impact strength and in their compressive strength after impact (CAI).

The fibre reinforced composite materials of the present invention are favourably employed in sports applications as golf shafts, fishing rods, tennis, badminton, squash and other rackets, hockey and other sticks, ski poles and the like.

In aerospace applications, they are favourably employed as aircraft primary structural materials (main wings, tail wing, floor beam, etc), secondary structural materials (flap, aileron, cowl, fairing, interior trim, etc), rocket motor cases, structural materials for artificial satellites, and the like.

In general industrial applications, they are favourably employed as structural materials for moving bodies such as cars, boats and railway carriages, drive shafts, plate springs, wind turbine blades, pressure vessels, fly-wheels, papermaking rollers, civil engineering and building materials (roofing materials, cables, reinforcing bars, retrofitting materials) and the like.

EXAMPLES

Below, the present invention is explained in detail by means of examples.

In Examples 1 to 11 and Comparative Examples 1 to 7, the measurement of the properties of the cured resin, the preparation of the prepreg, the measurement of the inplane shear strength of CFRP, the preparation of the unidirectional CFRP, the measurement of the properties of the unidirectional CFRP, the preparation of the cylindrical CFRP, and the measurement of the properties of the cylindrical CFRP, were carried out as follows. Now, the measurements of the mechanical properties were all carried out in an environment of temperature 23° C. and relative humidity 50%.

(1) Measurement of the Properties of the Cured Resin

A. Measurement of the Tensile Elongation

The resin composition was heated to 80° C., poured into a mould, and then subjected to thermosetting for 2 hours in a hot air dryer at 130° C. to prepare a cured resin sheet of thickness 2 mm. Next, in accordance with JIS-K7113, Type 1 (½) small-size test pieces were cut out from the cured resin sheet and the tensile elongation determined.

B. Measurement of the Flexural Modulus

From a cured resin sheet prepared in the same way as in A, test pieces of width 10 mm and length 60 mm were cut out. A three-point bending test was carried out at a testing rate of 2.5 mm and a span length of 32 mm, and the flexural modulus and bending deflection determined in accordance with JIS-K7203.

C. Measurement of Rubbery Elastic Modulus

Using a cured resin sheet prepared as described for A, the rubbery elastic modulus G' was obtained by the DMA method according to SACMA SRM18R-94. The elastic modulus at the intersection between the extension of the straight portion in the glass transition region in the curve G' and the extension of the straight portion in the rubbery region was identified as the rubbery elastic modulus G', for use as an indicator of plastic deformability. In this case, viscoelasticity measuring system, expansion type "ARES" produced by Rheometric Scientific was used to measure at a heating rate of 5° C./min at a frequency of 1 Hz.

(2) Preparation of the Prepreg

The resin composition was applied onto release paper using a reverse roll coater, to prepare resin film. Next, carbon fibre which had been unidirectional arranged in the form of a sheet was interposed between two layers of the resin film, and then heat and pressure applied to effect impregnation of the resin composition. In this way, there was prepared a unidirectional prepreg of carbon fibre aerial weight 125 g/m$^2$.

(3) Measurement of Inplane Shear Strength

A predetermined number of sheets of a unidirectional prepreg were laminated to have the carbon fibre in the directions of ±45°, and the laminate was heated and pressurized at 135° C. at a pressure of 290 Pa in an autoclave, to be cured, and the sample thus prepared was measured according to JIS K 7079.

(4) Preparation of the Unidirectional CFRP

A specified number of sheets of the unidirectional prepreg were superimposed with the reinforcing fibre direction the same in each case, and then curing carried out by applying heat and pressure for 2 hours in an autoclave at a temperature of 135°C. and a pressure of 290 Pa, to produce a unidirectional composite material.

(5) Measurement of the Properties of the Unidirectional CFRP

A. Mode I Interlayer Fracture Toughness GIC

The unidirectional CFRP obtained in the above (4) was measured by the double cantilever (DCB) test according to JIS K 7086, to obtain the mode I interlayer fracture toughness GIC (J/m$^2$).

B. Measurement of the 0° Compressive Strength

Test pieces of width 12.7 mm and length 79.4 mm were prepared from a unidirectional composite material obtained by the laminating of 11 sheets of the unidirectional prepreg, and then the 0° compressive strength measured, in accordance with ASTM D690.

C. Measurement of the 90° Tensile Strength and the 90° Elongation

Test pieces of width 25.4 mm and length 38.1 mm were prepared from a unidirectional composite material obtained by the laminating of 22 sheets of the unidirectional prepreg. Then, tensile testing was carried out and the 90° tensile elongation and the 90° tensile strength measured, in accordance with ASTM D3039.

(6) Preparation of a Cylindrical CFRP

By the procedure described in (a) to (e) below, two types of cylindrical composite material of internal diameter 6.3 mm and 10 mm respectively, and having a $[0_3/\pm 45_3]$ laminate structure in terms of the cylinder axis direction, were prepared. As mandrels, there were used stainless steel round rods of diameter 6.3 mm and 10 mm (both of length 1000 mm).

(a) From the unidirectional prepreg, two rectangular sheets were cut out of size 800 mm length×68 mm width in the case of the mandrel of diameter 6.3 mm, and size 800 mm length×103 mm width in the case of the mandrel of diameter 10 mm, such that the direction of the carbon fibre was at 45° degrees in reference to the axis direction of the mandrel. These two sheets were stuck together in such a way that the fibre direction mutually crossed, but staggered in the widthwise direction at 10 mm in the case of the mandrel of diameter 6.3 mm and at 16 mm in the case of the mandrel of diameter 10 mm (corresponding in each case to half the mandrel circumference).

(b) The mutually stuck-together prepreg was then wound onto the release-treated mandrel in such a way that the lengthwise direction of the prepreg matched the mandrel axial direction. (Bias member)

(c) On top of this, prepreg which had been cut (with the direction of the fibre lying in the lengthwise direction) to a rectangular shape of 800 mm length×77 mm width in the case of the mandrel of diameter 6.3 mm, and 800 mm length×112 mm width in the case of the mandrel of diameter 10 mm, was wound around in such a way that prepreg lengthwise direction matched the mandrel axial direction. (Straight member)

(d) Wrapping tape (heat resistant film tape) was then wound round and hot moulding carried out for 2 hours at 130° C. in a curing oven.

(e) After moulding, the mandrel was extracted, then the wrapping tape removed, and the cylindrical CFRP obtained.

(7) Measurement of the Properties of the Cylindrical CFRP

A. Measurement of the Flexural Failure Load

Using the cylindrical CFRP of internal diameter 10 mm, the flexural failure load was measured based on the three-point bending test described in "Qualification Standards and Standard Confirmation Methods for Shafts for Golf Clubs" (Ed. by the Consumer Product Safety Committee, Minister for International Trade and Industry, Approval No. 5-SAN-2087, 1993). The span length was 300 mm and the testing rate was 5 mm/min.

B. Measurement of the Torsional Strength

Test pieces of length 400 mm were cut from the cylindrical CFRP of internal diameter 10 mm, and torsional testing carried out in accordance with the method described in "Qualification Standards and Standard Confirmation Methods for Shafts for Golf Clubs" (Ed. by the Consumer Product Safety Committee, Minister for International Trade and Industry, Approval No. 5-SAN-2087, 1993). The test piece gauge length was made 300 mm, with 50 mm at each end of the test piece being gripped by the clamping jigs. The torsional strength was calculated from the following formula.

torsional strength (N.m.deg)=failure torque (N.m)×angle of torsion at failure (deg)

C. Measurement of the Radial Compressive Failure Load

A test piece of length 15 mm was cut out from the cylindrical composite material of internal diameter 10 mm, then a compressive load applied in the radial direction of the cylinder via a flat stainless steel plate until failure occurred. The load at the time of failure was taken as the compressive failure load. The testing rate was 5 mm/min.

D. Measurement of the Charpy Impact Strength

Charpy impact testing was conducted by the method described in JIS-K7077, excepting that there was used a cylindrical CFRP as the test piece. A test piece of length 90 mm was cut from the cylindrical CFRP of internal diameter 6.3 mm and then, using a span length of 40 mm, a hammer swing angle of 135° and a capacity 300 kg.cm, an impact was applied from a direction, to measure the maximum impact load as the impact strength.

(8) Measurement of Functional Group Content on the Surface of Carbon Fibre

A. Surface Specific Oxygen Content O/C

The surface specific oxygen content O/C was obtained by the X-ray photoelectron spectroscopy according to the following procedure. At first, the sizing agent, etc. were removed from the carbon fibre bundle to be measured, using a solvent, and the carbon fibre bundle was cut at a proper length and spread on a sample mount made of stainless steel, for measurement according to the following conditions.

Photoelectron escape angle: 90 degrees

X-ray source: MgK α1,2

Vacuum degree in the sample chamber: $1 \times 10^{-8}$ Torr

Then, for correcting the peak affected by the electrification caused by measurement, the bond energy value B.E. of the main peak of C1 S was adjusted to 284.6 eV. The C1s peak area [C1s] was obtained by drawing a straight base line in a range of 282 to 296 eV, and the O1s peak area [O1s] was obtained by drawing a straight base line in a range of 528 to 540 eV.

The surface specific oxygen content O/C was obtained from the following formula, using the ratio of the above O1s peak area [O1s] to the C1s peak area [C1s] and the sensitivity correction value peculiar to the instrument.

$O/C=([O1s]/[C1s])/$(Sensitivity correction value)

The measuring instrument used here was ESCA-750 made by Shimadzu Corp., and 2.85 was used as the sensitivity correction value peculiar to the instrument.

Surface Carboxyl Group Content COOH/C

The surface carboxyl group content COOH/C was obtained by the chemically modified X-ray photoelectron spectroscopy according to the following procedure. At first, the sizing agent, etc. were removed from the carbon fibre bundle to be measured, using a solvent, and the carbon fibre bundle was cut at a proper length and spread on a sample mount made of platinum, being exposed to air containing 0.02 mol/L of dicyclohexylcarbodiimide gas and 0.04 mole/L of pyridine gas at 60° C. for 8 hours, to be chemically modified, for measurement under the following conditions.

Photoelectron escape angle: 35 degrees
X-ray source: A1K α1,2
Vacuum degree in the sample chamber: $1\times10^{-8}$ Torr Then, for correcting the peak affected by the electrification caused by measurement, the bond energy value B.E. of the main peak of C1s was adjusted to 284.6 eV. The C1s peak area [C1s] was obtained by drawing a straight base line in a range of 282 to 296 eV, and the F1s peak area [F1s] was obtained by drawing a straight base line in a range of 682 to 695 eV.

Furthermore, as a comparative sample, the rate of reaction r was obtained from the C1s peak slitting of chemically modified polyacrylic acid, and dicyclohexylcarbodiimide derivative remaining rate m was obtained from the O1s peak splitting. The surface carboxyl group content COOH/C was obtained from the following formula:

COOH/C=[[F1s]/{3k[C1s]−(2+13 m)[F1s])r}]×100(%)

In this case, Model SSX-100-206 produced by SSI, USA was used. The sensitivity correction value k of F1s peak area to C1s peak area peculiar to this instrument was 3.919.

Some examples and comparative examples will now be explained. References to 'parts' in these examples and comparative examples all denote 'parts by weight'. The examples and comparative examples are shown together in Tables 1 to 3.

Examples 7 to 9 and Comparative Examples 4 to 6 are examples where the tensile modulus of carbon fibre was changed, and are shown in Table 2. Example 8 and Comparative Example 6 are examples where the surface functional group content of carbon fibre was changed, and are shown in Table 3.

Example 1

The following raw materials were mixed by a kneader, to obtain a resin composition.

| | |
|---|---|
| Bisphenol A type epoxy resin ("Epikote" 828, made by Yuka Shell Epoxy K.K.) | 40 parts |
| Bisphenol A type epoxy resin ("Epikote" 1001, made by Yuka Shell Epoxy K.K.) | 50 parts |
| Phenol novolak type epoxy resin ("Epikote" 154, made by Yuka Shell Epoxy K.K.) | 10 parts |
| Dicyandiamide (DICY7, made by Yuka Shell Epoxy K.K.) | 5 parts |
| 3-(3,4-dichlorophenyl)-1,1-dimethylurea (DCMU99, made by Hodogawa Chemical Co., Ltd.) | 3 parts |
| N-n-butoxymethylacrylamide (made by Kasano Kosan K.K.) | 5 parts |
| Polyvinyl formal ("Vinylek" K, made by Chisso Corp.) | 7 parts |

This resin composition was used to prepare a cured resin sheet according to the method described above. Furthermore, this resin composition was used together with carbon fibre with a tensile modulus of 294 GPa, a crystal size of 20 Å, a surface specific oxygen content O/C of 0.09 and a surface carboxyl group content COOH/C of 1%, to prepare a prepreg with a matrix resin content of 24 wt %. The GIC of the CFRP obtained from this prepreg was 400 J/m$^2$.

The inplane shear strength of the CFRP obtained from this prepreg was 140 MPa, satisfying the formula (i).

Furthermore, the radial compressive strength and impact strength of the cylindrical CFRP obtained by using this prepreg as the straight member and the bias member were good.

Example 2

The following raw materials were mixed by a kneader, to obtain a resin composition.

| | |
|---|---|
| Bisphenol A type epoxy resin ("Epikote" 828, made by Yuka Shell Epoxy K.K.) | 40 parts |
| Bisphenol A type epoxy resin ("Epikote" 1001, made by Yuka Shell Epoxy K.K.) | 50 parts |
| Phenol novolak type epoxy resin ("Epikote" 154, made by Yuka Shell Epoxy K.K.) | 10 parts |
| Dicyandiamide (DICY7, made by Yuka Shell Epoxy K.K.) | 5 parts |
| 3-(3,4-dichlorophenyl)-1,1-dimethylurea (DCMU99, made by Hodogaya Chemical Co., Ltd.) | 3 parts |
| N,N-diethylacrylamide (made by the Kohjin Co.) | 5 parts |
| Polyvinyl formal ("Vinylek" K, made by Chisso Corp.) | 7 parts |

This resin composition was used to prepare a cured resin sheet according to the method described above. Furthermore, using the carbon fibre as used in Example 1, a prepreg with a matrix resin content of 24 wt % was prepared according to the method described above. The GIC of the CFRP obtained from this prepreg was 357 J/m$^2$.

The inplane shear strength of the CFRP obtained from this prepreg was 150 MPa, satisfying the formula (i).

Furthermore, the radial compressive strength and impact strength of the cylindrical CFRP obtained by using this prepreg as the straight member and the bias member were good.

Example 3

The following raw materials were mixed by a kneader, to obtain a resin composition.

| | |
|---|---|
| Bishpenol A type epoxy resin ("Epikote" 828, made by Yuka Shell Epoxy K.K.) | 40 parts |
| Bishpenol A type epoxy resin ("Epikote" 1001, made by Yuka Shell Epoxy K.K.) | 50 parts |
| Phenol novolak type epoxy resin ("Epikote" 154, made by Yuka Shell Epoxy K.K.) | 10 parts |
| Dicyandiamide (DICY7, made by Yuka Shell Epoxy K.K.) | 5 parts |
| 3-(3,4-dichorophenyl)-1,1-dimethylurea (DCMU99, made by Hodogaya Chemical Co., Ltd.) | 3 parts |
| N-isopropylacrylamide (made by the Kohjin Co.) | 5 parts |
| Polyvinyl formal ("Vinylek" K, made by Chisso Corp.) | 7 parts |

This resin composition was used to prepare a cured resin sheet according to the method described above. Furthermore, this resin composition and the carbon fibre as used in Example 1 were used to prepare a prepreg with a matrix resin content of 24 wt % according to the method described above. The GIC of the CFRP obtained from this prepreg was 390 J/m$^2$.

Furthermore, the cylindrical CFRP obtained by using this prepreg as the straight member and the bias member showed good strength properties as shown in Table 1. The inplane shear strength of the CFRP obtained from this prepreg was 120 MPa, satisfying the formula (i).

Furthermore, the radial compressive strength and impact strength of the cylindrical CFRP obtained by using this prepreg as the straight member and the bias member were good.

Example 4

The following raw: materials were mixed by a kneader, to obtain a resin composition.

| | |
|---|---|
| Bisphenol A type epoxy resin ("Epikote" 828, made by Yuka Shell Epoxy K.K.) | 40 parts |
| Bisphenol A type epoxy resin ("Epikote" 1001, made by Yuka Shell Epoxy K.K.) | 50 parts |
| Phenol novolak type epoxy resin ("Epikote" 154, made by Yuka Shell Epoxy K.K.) | 10 parts |
| Dicyandiamide (DICY7, made by Yuka Shell Epoxy K.K.) | 5 parts |
| 3-(3,4-dichorophenyl)-1,1-dimethylurea (DCMU99, made by Hodogaya Chemical Co., Ltd.) | 3 parts |
| Polyester polyurethane ("PANDEX" T-5205, made by Dainippon Ink & Chemicals, Inc.) | 5 parts |
| Polyvinyl formal ("Vinylek" K, made by Chisso Corp.) | 4 parts |

This resin composition was used to prepare a cured resin according to the method described above. Furthermore, this resin composition and the carbon fibre as used in Example 1 were used to prepare a prepreg with a matrix resin content 24 wt % according to the method described above. The GIC of the CFRP obtained from this prepreg was 410 J/m$^2$.

The inplane shear strength of the CFRP obtained from this prepreg was 138 MPa, satisfying the formula (i).

Furthermore, the radial compressive strength and impact strength of the cylindrical CFRP obtained by 4sing this prepreg as the straight member and the bias member were good.

Example 5

The following raw materials were mixeed by a kneader, to obtain a resin composition.

| | |
|---|---|
| Bisphenol F type epoxy resin ("Epikote" 807, made by Yuka Shell Epoxy K.K.) | 40 parts |
| Bisphenol F type epoxy resin ("Epikote" E4002P, made by Yuka Shell Epoxy K.K.) | 40 parts |
| Biphenyl type epoxy resin ("Epikote" YX4000, made by Asahi Ciba K.K.) | 20 parts |
| Dicyandiamide (DICY7, made by Yuka Shell Epoxy K.K.) | 5 parts |
| 3-(3,4-dichorophenyl)-1,1-dimethylurea (DCMU99, made by Hodogaya Chemical Co., Ltd.) | 3 parts |
| Polyvinyl formal ("Vinylek" K, made by Chisso Corp.) | 5 parts |

The following raw materials were mixed by a kneader, to obtain a resin

This resin composition was used to prepare a cured resin according to the method described above. Furthermore, this resin composition and the carbon fibre as used in Example 1 were used to prepare a prepreg with a matrix resin content of 24 wt % according to the method described above. The GIC of the CFRP obtained from this prepreg was 288 J/m$^2$.

The inplane shear strength of the CFRP obtained from this prepreg was 170 MPa, satisfying the formula (i). Furthermore, the cylindrical CFRP obtained by using this prepreg as the straight member and the bias member showed good strength properties as shown in Table 1.

Example 6

The following raw: materials were mixed by a kneader, to obtain a resin composition.

| | |
|---|---|
| Bisphenol F type epoxy resin ("Epikote" 807, made by Yuka Shell Epoxy K.K.) | 40 parts |
| Bisphenol F type epoxy resin ("Epikote" E4002P, made by Yuka Shell Epoxy K.K.) | 40 parts |
| Biphenyl type epoxy resin ("Epikote" YX4000, made by Asahi Ciba K.K.) | 20 parts |
| Dicyandiamide (DICY7, made by Yuka Shell Epoxy K.K.) | 5 parts |
| 3-(3,4-dichorophenyl)-1,1-dimethylurea (DCMU99, made by Hodogaya Chemical Co., Ltd.) | 3 parts |
| N,N-dimethylacrylamide (made by the Kohjin Co.) | 5 parts |
| Polyvinyl formal ("Vinylek" K, made by Chisso Corp.) | 5 parts |

This resin composition was used to prepare a cured resin sheet and a prepreg as described for Example 1.

The GIC of the CFRP obtained from this prepreg was 455 J/m$^2$.

The inplane shear strength of the CFRP obtained from this prepare was 175 MPa, satisfying the formula (i). Furthermore, the cylindrical CFRP obtained by using this prepreg as the straight member and the bias member showed good strength properties as shown in Table 1.

Comparative Example 1

The following raw materials were mixed by a kneader, to obtain a resin composition.

| | |
|---|---|
| Bisphenol A type epoxy resin ("Epikote" 828, made by Yuka Shell Epoxy K.K.) | 10 parts |
| Bisphenol A type epoxy resin ("Epikote" 1001, made by Yuka Shell Epoxy K.K.) | 40 parts |
| Phenol novolak type epoxy resin ("Epikote" 154, made by Yuka Shell Epoxy K.K.) | 10 parts |
| Resorcinol diglycidyl ether type epoxy resin ("Denacol" EX201, made by Nagase Chemicals Ltd.) | 30 parts |
| Brominated bisphenol A type epoxy resin ("Epiclon" 152, made by Danippon Ink & Chemicals, Inc.) | 10 parts |
| Dicyandiamide (DICY7, made by Yuka Shell Epoxy K.K.) | 5 parts |
| 3-(3,4-dichorophenyl)-1,1-dimethylurea (DCMU99, made by Hodogaya Chemical Co., Ltd.) | 3 parts |
| Polyvinyl formal ("Vinylek" K, made by Chisso Corp.) | 7 parts |

This resin composition was used to prepare a cured resin according to the method described above. Furthermore, the carbon fibre as used in Example 1 was used to prepare a prepreg with a matrix resin content of 24 wt %.

The GIC of the CFRP obtained from this prepreg was 190 J/m$^2$. The inplane shear strength of the CFRP obtained from the prepreg was 102 MPa, not satisfying the formula (i).

Furthermore, the radial compressive strength and impact strength of the cylindrical CFRP obtained by using this prepreg as the straight member and the bias member were poor.

Comparative Example 2

The following raw materials were mixed by a kneader, to obtain a resin composition.

| | |
|---|---|
| Bisphenol A type epoxy resin ("Epikote" 828, made by Yuka Shell Epoxy K.K.) | 30 parts |
| Bisphenol A type epoxy resin ("Epikote" 1001, made by Yuka Shell Epoxy K.K.) | 40 parts |
| Phenol novolak type epoxy resin ("Epikote" 154, made by Yuka Shell Epoxy K.K.) | 30 parts |
| Dicyandiamide (DICY7, made by Yuka Shell Epoxy K.K.) | 5 parts |
| 3-(3,4-dichorophenyl)-1,1-dimethylurea (DCMU99, made by Hodogaya Chemical Co., Ltd.) | 3 parts |
| Polyvinyl formal ("Vinylek" K, made by Chisso Corp.) | 7 parts |

This resin composition was used to prepare a cured resin and a prepreg according to the method described above. The prepreg was obtained by using carbon fibre with a tensile modulus of 294 GPa as the reinforcing fibre, and had a matrix resin content of 24%.

The GIC of the CFRP obtained from this prepreg was 110 J/m$^2$. The inplane shear strength of the CFRP obtained from this prepreg was 95 MPa, not satisfying the formula (i).

Furthermore, the radial compressive strength and impact strength of the cylindrical CFRP obtained by using this prepreg as the straight member and the bias member were poor.

Comparative Example 3

The following raw materials were mixed by a kneader, to obtain a resin composition.

| | |
|---|---|
| Bisphenol F type epoxy resin ("Epikote" 807, made by Yuka Shell Epoxy K.K.) | 20 parts |
| Bisphenol F type epoxy resin ("Epikote" E4002P, made by Yuka Shell Epoxy K.K.) | 40 parts |
| Glycidylamine type epoxy resin ("Sumi-epoxy" ELM434, made by Sumitomo Chemical Co., Ltd.) | 40 parts |
| Dicyandiamide (DICY7, made by Yuka Shell Epoxy K.K.) | 5 parts |
| 3-(3,4-dichlorophenyl)-1,1-dimethylurea (DCMU99, made by Hodogaya Chemical Co., Ltd.) | 3 parts |
| N-n-butoxymethylacrylamide (made by Kasano Kosan K.K.) | 5 parts |
| Polyvinyl formal ("Vinylek" K, made by Chisso Corp.) | 5 parts |

This resin composition was used, to prepare a cured resin sheet and a prepreg as described for Example 1.

The GIC of the CFRP obtained from this prepreg was 130 J/m$^2$. The inplane shear strength of the CFRP obtained from this prepreg was 100 MPa, satisfying the formula (i).

Example 5

The resin composition as obtained in Example 1 and carbon fibre with a tensile modulus of 377 GPa were used, to prepare a prepreg with a matrix resin content of 24 wt % according to the method described above. The inplane shear strength of the CFRP obtained from the prepreg was 92 MPa, satisfying the formula (i).

Furthermore, the radial compressive strength and impact strength of the cylindrical. CFRP obtained by using the prepreg of Example 1 as the straight member and the prepreg of this example as the bias member were good.

Comparative Example 4

The resin composition as obtained in Comparative Example 2 and carbon fibre with a tensile modulus of 377 GPa were used to prepare a prepreg with a matrix resin content of 24 wt % according to the method described above. The inplane shear strength of the CFRP obtained from this prepreg was 72 MPa, not satisfying the formula (i). Furthermore, the radial compressive strength and impact strength of the cylindrical CFRP obtained by using the prepreg of Comparative Example 2 as the straight member: and the prepreg of this comparative example as the bias member were poor.

Example 6

The resin composition as obtained in Example 1 and carbon fibre with a tensile modulus of 475 GPa were used to prepare a prepreg with a matrix resin content of 24 wt % according to the method described above. The inplane shear strength of the CFRP obtained from the prepreg was 90 MPa, satisfying the formula (i). Furthermore, the radial compressive strength and impact strength of the cylindrical CFRP obtained by using the prepreg of Example 1 as the straight member and the prepreg of this example as the bias member were good.

Comparative Example 4

The resin composition as obtained in Comparative Example 2 and carbon fibre with a tensile modulus of 475 GPa were used to prepare a prepreg with a matrix resin content of 24 wt % according to the method described above. The inplane shear strength of the CFRP obtained from this prepreg was 58 MPa, not satisfying the formula (i). Furthermore, the radial compressive strength and impact strength of the cylindrical CFRP obtained by using the prepreg of Comparative Example 2 as the straight member and the prepreg of this comparative example as the bias member were poor.

Example 7

The resin composition as obtained in Example 1 and carbon fibre with a tensile modulus of 539 GPa were used to prepare a prepreg with a matrix resin content of 33 wt % according to the method described above. The inplane shear strength of the CFRP obtained from the prepreg was 63 MPa, satisfying the formula (i).

Furthermore, the radial compressive strength and impact strength of the cylindrical CFRP obtained by using the prepreg of Example 1 as the straight member and the prepreg of this example as the bias member were good.

Comparative Example 5

The resin composition as obtained in Comparative Example 2 and carbon fibre with a tensile modulus of 539 GPa were used to prepare a prepreg with a matrix resin content of 33 wt % according to the method described above. The inplane shear strength of the CFRP obtained from this prepreg was 47 MPa, not satisfying the formula (i). Furthermore, the radial compressive strength and impact strength of the cylindrical CFRP obtained by using the prepreg of Comparative Example 2 as the straight member and the prepreg of this comparative example as the bias member were poor.

Example 8

The resin composition as obtained in Example 1 and carbon fibre with a tensile modulus of 230 GPa, crystal grain size Lc of 18 Å, surface specific oxygen content O/C of 0.16 and surface carboxyl group content COOH/C of 2.5% were used to prepare a prepreg with a matrix resin content of 24 wt %. The inplane shear strength of the CFRP obtained from this prepreg was 153 MPa, satisfying the formula (i). Furthermore, the radial compressive strength and impact strength of the cylindrical CFRP obtained by using this prepreg as the straight member and the bias member were good.

Comparative Example 6

The resin composition as obtained in Example 1 and carbon fibre with a tensile modulus of 230 GPa, crystal grain size Lc of 18 Å, surface specific oxygen content O/C of 0.01 and surface carboxyl group content COOH/C of 0.05% were used to prepare a prepreg with a matrix resin content of 24 wt %. The inplane shear strength of the CFRP obtained from this prepreg was 111 MPa, not satisfying the formula (i). Furthermore, the radial compressive strength and impact strength of the cylindrical CFRP obtained by using this prepreg as the straight member and the bias member were poor.

INDUSTRIAL APPLICATION

The present invention can provide a prepreg and carbon fibre reinforced composite materials with excellent properties, which can provide, for example, golf club shafts excellent in bending strength and torsional strength, and yet excellent in the radial compressive strength and impact strength of cylindrically formed articles.

TABLE 1

|  | Examples | | | | | | Comparative examples | | |
|---|---|---|---|---|---|---|---|---|---|
|  | 1 | 2 | 3 | 4 | 5 | 6 | 1 | 2 | 3 |
| Component (A) | | | | | | | | | |
| "Epikote" 807 (low MW bifunctional epoxy resin) | — | — | — | — | 40 | 40 | — | — | 20 |
| "Epikote" E4002P (high MW bifunctional epoxy resin) | — | — | — | — | 40 | 40 | — | — | 40 |
| "Epikote" 828 (low MW bifunctional epoxy resin) | 40 | 40 | 40 | 40 | — | — | 10 | 30 | — |
| "Epikote" 1001 (high MW bifunctional epoxy resin) | 50 | 50 | 50 | 50 | — | — | 40 | 35 | — |
| "Denacol" EX201 (low MW epoxy resin of formula I) | — | — | — | — | — | — | 30 | — | — |
| "Epikote" YX4000 (low epoxy resin of formula II) | — | — | — | — | 20 | 20 | — | — | — |
| "Epiclon" 152 (low epoxy resin of formula III) | — | — | — | — | — | — | 10 | — | — |
| "Epikote" 154 (multi-functional epoxy resin) | 10 | 10 | 10 | 10 | — | — | 10 | 35 | 40 |
| "Sumi-epoxy" ELM434 (multi-functional epoxy resin) | — | — | — | — | — | — | — | — | — |
| Component (B) | | | | | | | | | |
| Dicyandiamide (curing agent) | 5 | 5 | 5 | 5 | 5 | 5 | 5 | 5 | 5 |
| 3-(3,4-dichlorophenyl)-1,1-dimethylurea (curing auxiliary) | 3 | 3 | 3 | 3 | 3 | 3 | 3 | 3 | 3 |
| Component (C) | | | | | | | | | |
| N-n-butoxymethylacrylamide | 5 | — | — | — | — | — | — | — | 5 |
| N,N-diethylacrylamide | — | 5 | — | — | — | — | — | — | — |
| N-isopropylacrylamide | — | — | 5 | — | — | — | — | — | — |
| N,N-dimethylacrylamide | — | — | — | — | — | 5 | — | — | — |
| Component (D) | | | | | | | | | |
| PANDEX T-5205 | — | — | — | 5 | — | — | — | — | — |
| Thermoplastic resin (polyvinyl formal) "Vinylek" K | 7 | 7 | 7 | 4 | 5 | 5 | 7 | 7 | 5 |
| Properties of the cured resin | | | | | | | | | |
| Flexural modulus (Gpa) | 3.6 | 3.5 | 3.5 | 3.6 | 3.7 | 3.8 | 3.5 | 3.1 | 3.5 |
| Tensile elongation (%) | 10.0 | 10.4 | 10.3 | 10.1 | 9.5 | 10.4 | 10.1 | 5.5 | 4.5 |
| Bending deflection (mm) | 14.0 | 12.5 | 13.0 | 13.5 | 19.0 | 19.0 | 7.6 | 6.3 | 6.0 |
| Rubbery elastic modulus (MPa) | 5.0 | 5.1 | 4.8 | 4.7 | 4.7 | 4.8 | 12.3 | 11.5 | 12.4 |
| Inplane shear strength of bias and straight members (MPa) | 140 | 150 | 120 | 138 | 170 | 175 | 102 | 95 | 100 |
| −205 × LOG (E) + 610 (bias and straight members) | 104 | 104 | 104 | 104 | 104 | 104 | 104 | 104 | 104 |
| Mode I interlayer fracture toughness $G_{IC}$ (J/m$^2$) | 400 | 357 | 390 | 410 | 288 | 455 | 90 | 110 | 130 |
| 90° tensile strength (MPa) | 92 | 94 | 94 | 95 | 95 | 96 | 81 | 80 | 82 |
| Properties of the cylindrical composite | | | | | | | | | |
| Flexural strength (N) | 1280 | 1240 | 1200 | 1260 | 1280 | 1290 | 1200 | 990 | 1200 |
| Torsional strength (N.m.deg) | 2800 | 2750 | 2500 | 2750 | 2550 | 2750 | 1900 | 1790 | 1790 |
| radial compressive strength (N) | 670 | 640 | 650 | 660 | 610 | 650 | 510 | 480 | 480 |
| Charpy impact strength (N) | 890 | 870 | 880 | 880 | 830 | 880 | 760 | 770 | 770 |

TABLE 2

|  | Example 7 | Comp. Example 4 | Example 8 | Comp. example 5 | Example 9 | Comp. example 6 |
|---|---|---|---|---|---|---|
| Tensile modulus of carbon fiber (Gpa) | | | | | | |
| Straight member | 294 | 294 | 294 | 294 | 294 | 294 |
| Bias member | 377 | 377 | 475 | 475 | 539 | 539 |
| Matrix resin content (Wt %) | 24 | 24 | 24 | 24 | 33 | 33 |

TABLE 2-continued

|  | Example 7 | Comp. Example 4 | Example 8 | Comp. example 5 | Example 9 | Comp. example 6 |
|---|---|---|---|---|---|---|
| Inplane shear strength of bias member (MPa) | 92 | 72 | 90 | 58 | 63 | 47 |
| −205 × LOG (E) + 610 (bias member) | 82 | 82 | 61 | 61 | 50 | 50 |
| Properties of the cylindrical composite |  |  |  |  |  |  |
| flexural strength (N) | 1210 | 1160 | 1210 | 1160 | 1250 | 1110 |
| torsional strength (N.m.deg) | 1380 | 1310 | 1320 | 1130 | 1290 | 1210 |
| radial compressive strength (N) | 560 | 440 | 580 | 490 | 590 | 440 |
| Charpy impact strength (N) | 830 | 740 | 850 | 770 | 810 | 720 |

TABLE 3

|  | Example 8 | Comp. Example 6 |
|---|---|---|
| Tensile modulus of carbon fiber (Gpa) | 230 | 230 |
| Surface specific oxygen content O/C | 0.16 | 0.01 |
| Surface carboxyl group content COOH/C (%) | 0.25 | 0.05 |
| Inplane shear strength of bias and straight members (MPa) | 153 | 111 |
| −205 × LOG (E) + 610 (bias and straight members) | 126 | 126 |
| Properties of the cylindrical composite |  |  |
| flexural strength (N) | 1220 | 1160 |
| torsional strength (N.m.deg) | 3390 | 1840 |
| radial compressive strength (N) | 620 | 510 |
| Charpy impact strength (N) | 930 | 820 |

What is claimed is:

1. A prepreg, formed by impregnating carbon fibre with an epoxy resin composition containing the following components (A) and (B):

(A) an epoxy resin
   (B) a curing agent wherein the matrix resin content Wr (wt %) of the prepreg, the 0° tensile modulus E (GPa) of the carbon fibre, and the inplane shear strength S (MPa) of the carbon fibre reinforced composition material obtained by heating and curing the prepreg satisfy the following formulae (i) and (ii):

$$S \geq -205 \times \mathrm{LOG}(E) + 610 \quad (i)$$

$$15 \leq Wr \leq 40 \quad (ii).$$

2. A prepreg, according to claim 1, wherein the carbon fibre has a surface specific oxygen content O/C of 0.02 to 0.3.

3. A prepreg, according to claims 1 through 2, wherein the carbon fibre has a surface carboxyl group content COOH/C of 0.2 to 3.0% as measured by chemically modified X-ray photoelectron spectroscopy.

4. A prepreg, according to claims 1 through 3, wherein the epoxy resin composition contains the following component (C):

(C) a compound containing one functional group capable of reacting with the component (A) or (B) and a partial structure selected from the following formulae (1) to (4) in the molecule:

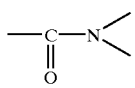 (1)

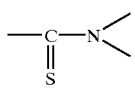 (2)

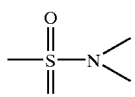 (3)

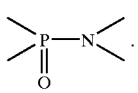 (4)

5. A prepreg, according to claim 4, wherein the amount of the component (C) is 0.5 to 15 parts by weight per 100 parts by weight of the component (A).

6. A prepreg, according to claim 4, wherein the functional group capable of reacting with an epoxy resin or curing agent in the component (C) is at least one selected from a group consisting of carboxyl group, phenolic hydroxyl group, amino group, secondary amine structure, mercapto group, epoxy group, and double bond conjugated with a carbonyl group.

7. A prepreg, according to claims 1 through 6, wherein the epoxy resin composition contains the following component (D):

(D) a polyester polyurethane having aromatic rings in the molecule.

8. A prepreg, according to claim 7, wherein the amount of the component (D) is 1 to 15 parts by weight per 100 parts by weight of the component (A).

9. A prepreg, according to claims 1 through 8, wherein the three-point bending deflection of the cured product obtained by curing the epoxy resin composition at 130° C. for 2 hours is 10 to 25 mm.

10. A prepreg, according to claims 1 through 8, wherein the rubbery elastic modulus G' (MPa) at the dynamic viscoelasticity at a test frequency of 0.5 Hz, of the cured product obtained by curing the epoxy resin composition at 130° C. for 2 hours satisfies the following formula (iv):

$$1 \leq G' \leq 8 \quad (iv).$$

11. A prepreg, according to claims 1 through 8, wherein the cured product obtained by curing the epoxy resin composition at 130° C. for 2 hours has a flexural modulus of 3.1 GPa or more.

12. A prepreg, according to claims 1 through 8, wherein the tensile elongation of the carbon fibre is 1.1% or more.

13. A prepreg, according to claims 1 through 8, wherein the carbon fibre has a diameter of 4 to 7 μm and substantially completely round in sectional form.

14. A prepreg, according to claims 1 through 8, wherein the carbon fibre has a diameter of 3 to 7 μm and cocoon-shaped in cross sectional form.

15. A prepreg, according to claims 1 through 8, wherein the crystal grain size Lc of the carbon fibre network face is 10 to 35 Angstrom and the 90° tensile strength of the sheet obtained by curing at 130° C. for 2 hours is 60 MPa or more.

16. Fibre reinforced composite materials, formed by heating and curing the prepreg described in claims 1 through 8.

17. A prepreg, formed by impregnating carbon fibre with an epoxy resin composition containing the following components (A) and (B):

(A) an epoxy resin (B) a curing agent wherein the mode I interlayer fracture toughness GIC of the fibre reinforced composite material obtained by heating and curing the prepreg is 200 J/m$^2$ or more.

18. A prepreg comprising a carbon fibre of 5 to 40 Angstrom in the crystal grain size Lc of the carbon network face obtained by wide angle X-ray diffraction impregnated with a resin composition comprising the following components (A) and (B) and having a tensile elongation of 8% or more after the prepreg has been cured at 130° C. for 2 hours:

(A) an epoxy resin composition comprising a bifunctional epoxy resin in an amount of 70 to 100 wt % per 100 wt % of all epoxy resins in the epoxy resin composition and further comprising a bifunctional epoxy resin of 450 or more in epoxy equivalent in an amount of 15 to 70 wt % per 100 wt % of all bifunctional epoxy resins;

(B) a curing agent and a thermoplastic resin, the thermoplastic resin being in an amount of 1 to 20 wt % per 100 wt % of the epoxy resin composition.

* * * * *